(12) United States Patent
Ota et al.

(10) Patent No.: US 7,917,899 B2
(45) Date of Patent: Mar. 29, 2011

(54) PROGRAM DEVELOPMENT APPARATUS, METHOD FOR DEVELOPING A PROGRAM, AND A COMPUTER PROGRAM PRODUCT FOR EXECUTING AN APPLICATION FOR A PROGRAM DEVELOPMENT APPARATUS

(75) Inventors: Yutaka Ota, Yokohama (JP); Atsushi Mizuno, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1017 days.

(21) Appl. No.: 11/362,728

(22) Filed: Feb. 28, 2006

(65) Prior Publication Data

US 2006/0200796 A1  Sep. 7, 2006

(30) Foreign Application Priority Data

Feb. 28, 2005  (JP) ................................ 2005-055020

(51) Int. Cl.
  *G06F 9/45* (2006.01)
(52) U.S. Cl. ................ 717/152; 717/106; 717/154
(58) Field of Classification Search .............. 717/106, 717/114, 125, 136, 151–158
See application file for complete search history.

(56) References Cited

U.S. PATENT DOCUMENTS

| | | | | |
|---|---|---|---|---|
| 5,175,856 A | * | 12/1992 | Van Dyke et al. | 717/151 |
| 5,179,702 A | * | 1/1993 | Spix et al. | 718/102 |
| 5,548,761 A | * | 8/1996 | Balasundaram et al. | 717/159 |
| 5,640,568 A | * | 6/1997 | Komatsu | 717/160 |
| 5,701,489 A | * | 12/1997 | Bates et al. | 717/157 |
| 6,003,129 A | * | 12/1999 | Song et al. | 712/244 |
| 6,091,896 A | * | 7/2000 | Curreri et al. | 717/125 |
| 6,195,676 B1 | * | 2/2001 | Spix et al. | 718/107 |
| 6,292,940 B1 | * | 9/2001 | Sato | 717/157 |
| 6,634,017 B2 | * | 10/2003 | Matsui et al. | 716/11 |
| 7,020,873 B2 | * | 3/2006 | Bik et al. | 717/156 |
| 7,146,606 B2 | * | 12/2006 | Mitchell et al. | 717/141 |
| 7,657,878 B2 | * | 2/2010 | Ota | 717/143 |
| 2002/0019973 A1 | * | 2/2002 | Hayashida | 717/106 |
| 2003/0074654 A1 | * | 4/2003 | Goodwin et al. | 717/161 |
| 2003/0167458 A1 | * | 9/2003 | Santhanam et al. | 717/114 |

(Continued)

FOREIGN PATENT DOCUMENTS

JP  63-16334  1/1988

(Continued)

OTHER PUBLICATIONS

Office Action issued on Jan. 11, 2011, in Japanese Patent Application No. 2005-055020 filed Dec. 28, 2010 (with English Translation).

*Primary Examiner* — Emerson C Puente
*Assistant Examiner* — Hiren Patel
(74) *Attorney, Agent, or Firm* — Oblon, Spivak, McClelland, Maier & Neustadt, L.L.P.

(57) ABSTRACT

A program development apparatus includes a storage device configured to store an operation definition defining a program description in a source program subjected to be optimized and a complex intrinsic function including an inline clause describing statements after the optimization. An analyzer is configured to perform a syntax analysis of the complex intrinsic function by reading the complex intrinsic function out of the storage device, so as to detect the operation definition and the inline clause. A code generator is configured to generate an object code from the source program by optimizing a program description corresponding to the operation definition in the source program into the statements in the inline clause.

20 Claims, 25 Drawing Sheets

U.S. PATENT DOCUMENTS

| | | | |
|---|---|---|---|
| 2003/0188299 A1* | 10/2003 | Broughton et al. | 717/141 |
| 2003/0204819 A1* | 10/2003 | Matsumoto et al. | 716/1 |
| 2004/0003379 A1* | 1/2004 | Hayashida | 717/140 |
| 2004/0025150 A1* | 2/2004 | Heishi et al. | 717/154 |
| 2004/0054882 A1* | 3/2004 | Borneo et al. | 712/300 |
| 2004/0088691 A1* | 5/2004 | Hammes et al. | 717/158 |
| 2004/0236929 A1* | 11/2004 | Akita | 712/216 |
| 2004/0243988 A1* | 12/2004 | Ota | 717/151 |
| 2004/0268109 A1* | 12/2004 | Rothman et al. | 713/1 |
| 2005/0283769 A1* | 12/2005 | Eichenberger et al. | 717/151 |
| 2006/0195828 A1* | 8/2006 | Nishi et al. | 717/140 |

FOREIGN PATENT DOCUMENTS

| | | |
|---|---|---|
| JP | 4-51328 | 2/1992 |
| JP | 4-175974 | 6/1992 |
| JP | 5-298115 | 11/1993 |
| JP | 7-84797 | 3/1995 |
| JP | 2000-163266 | 6/2000 |
| JP | 2000-284970 | 10/2000 |
| JP | 2002-24029 | 1/2002 |
| JP | 2003-196106 | 7/2003 |
| JP | 2004-70531 | 3/2004 |
| JP | 2004-295398 | 10/2004 |

* cited by examiner

COMPLEX INTRINSIC FUNCTION :
_ASM [DECLARATION SPECIFIER] DECLARATOR {INLINE CLAUSE   OPERATION DEFINITION}

INTRINSIC FUNCTION :
_asm [DECLARATION SPECIFIER] DECLARATOR {OPERATION DEFINITION}

INLINE CLAUSE :
_inline { [DECLARATION SEQUENCE] [STATEMENT SEQUENCE] }

OPERATION DEFINITION :
[DECLARATION SEQUENCE] [STATEMENT SEQUENCE]

FIG.4A

```
_asm void uci(int_reg_modify,int_reg_src) ;
_asm void uci(int a,int b){
        a=(a+10)|b;
        }
```
— OPERATION DEFINITION

FIG.4B

```
BEGIN
L50000,COMPLEX_INLINE_START
ASMFUNC,uci.P0(SINT),P1(SINT)             ----A1
LAB,L50001
COMPLEX_INLINE_END
JMP,L50001
LAB,L50000
T1(SINT)(Def)+P0(SINT),#L10
P0(SINT)|T1(SINT)(Def),P1(SINT)           ----A2
COMPLEX_BEHAVIOR_END
END
```

FIG.5A

```
_ASM void case2(int_reg_dest,int_reg_src,int_reg_src);
_ASM void case2(int R3,int,R1,int R2){
        _inline{
                        dsp1(R1,R2);
                        dsp2(0);
                        dsp3(R3);
                }
        R3=((R1<<1)|(R2>>1))+10;
        }
```

- INLINE CLAUSE (dashed box around _inline{...})
- OPERATION DEFINITION (dashed box around R3=((R1<<1)|(R2>>1))+10;)

FIG.5B

```
BEGIN
L50000,COMPLEX_INLINE_START
ASMFUNC,dsp1,P1(SINT),P2(SINT)
ASMFUNC,dsp2,#L0
ASMFUNC,dsp3,P0(SINT)
LAB,L50001
COMPLEX_INLINE_END
JMP,L50001
LAB,L50000
T2(SINT)(Def)>>P2(SINT),#L1
T1(SINT)(Def)<<P1(SINT),#L1
T0(SINT)(Def)|T1(SINT)(Def),T2(SINT)(Def)
P0(SINT)+T0(SINT)(Def),#L10
COMPLEX_BEHAVIOR_END
END
```

- B1 (ASMFUNC block)
- B2 (T2/T1/T0/P0 block)

FIG.6

```
int a,b,c,d,e;
void test(void){
        a=(((b+c)<<1)+((d-e)>>1))+10;
        }
```

FIG.7

```
BEGIN
T8(SINT F*)(Def)ADDR@_e(SINT)
T7(SINT)(Def)=*T8(SINT F*)(Def)
T9(SINT F*)(Def)ADDR@_d(SINT)
T6(SINT)(Def)=*T9(SINT F*)(Def)
T5(SINT)(Def)-T6(SINT)(Def),T7(SINT)(Def)
T4(SINT)(Def)>>T5(SINT)(Def),#L1
T13(SINT F*)(Def)ADDR@_c(SINT)
T12(SINT)(Def)=*T13(SINT F*)(Def)
T14(SINT F*)(Def)ADDR@_b(SINT)
T11(SINT)(Def)=*T14(SINT F*)(Def)
T10(SINT)(Def)+T11(SINT)(Def),T12(SINT)(Def)
T3(SINT)(Def)<<T10(SINT)(Def),#L1
T2(SINT)(Def)|T3(SINT)(Def),T4(SINT)(Def)
T1(SINT)(Def)+T2(SINT)(Def),#L10
T0(SINT F*)(Def)ADDR@_a(SINT)
*T0(SINT F*)(Def)=T1(SINT)(Def)
END
```
~C1

FIG.8

```
BEGIN
T8(SINT F*)(Def)ADDR@_e(SINT)
T7(SINT)(Def)=*T8(SINT F*)(Def)
T9(SINT F*)(Def)ADDR@_d(SINT)
T6(SINT)(Def)=*T9(SINT F*)(Def)
T5(SINT)(Def)-T6(SINT)(Def),T7(SINT)(Def)
T13(SINT F*)(Def)ADDR@_c(SINT)
T12(SINT)(Def)=*T13(SINT F*)(Def)
T14(SINT F*)(Def)ADDR@_b(SINT)
T11(SINT)(Def)=*T14(SINT F*)(Def)
T10(SINT)(Def)+T11(SINT)(Def),T12(SINT)(Def)
ASMFUNC,dsp1,T10(SINT)(Def),T5(SINT)(Def)
ASMFUNC,dsp2,#L0
ASMFUNC,dsp3,T1(SINT)(Def)
T0(SINT F*)(Def)ADDR@_a(SINT)
*T0(SINT F*)(Def)=T1(SINT)(Def)
END
```
~D1

FIG.9

```
lw      $11,%sdaoff(_c)($14)
lw      $9,%sdaoff(_e)($14)
lw      $12,%sdaoff(_d)($14)
lw      $10,%sdaoff(_b)($14)
sub     $12,$9
add3    $11,$10,$11
sll3    $0,$11,1
sra     $12,1
or      $0,$12
add     $0,10
sw      $0,%sdaoff(_a)($14)
ret
```

E1 (dashed box around add3, sll3, sra, or, add)

FIG.10

```
lw      $9,%sdaoff(_e)($14)
lw      $11,%sdaoff(_c)($14)
lw      $10,%sdaoff(_b)($14)
lw      $12,%sdaoff(_d)($14)
add3    $10,$10,$11
sub     $12,$9
dsp1    $10,$12
dsp2    0
dsp3    $11
sw      $11,%sdaoff(_a)($14)
ret
```

F1 (dashed box around dsp1, dsp2, dsp3)

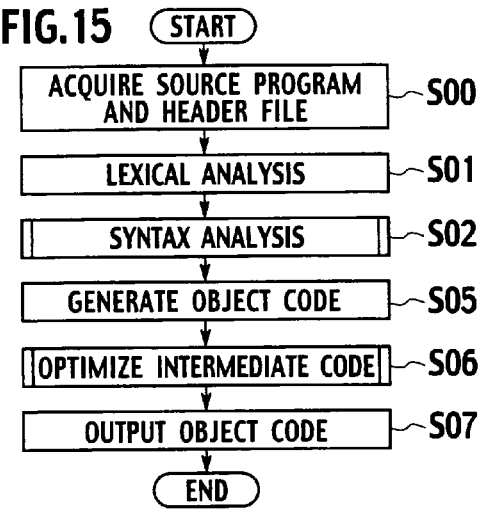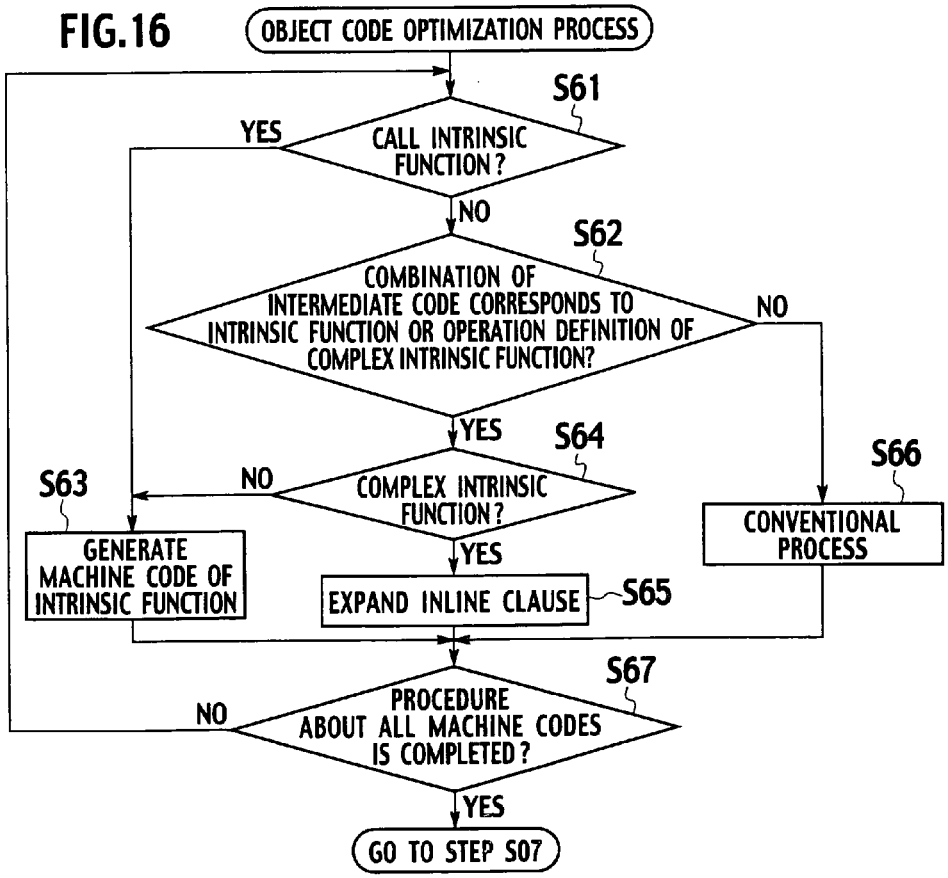

FIG.18

```
_ASM void case2(int_reg_dest,int_reg_src,int_reg_src);
_ASM void case2(int R3,int R1,int R2){
        _inline{
                dsp1(R1,R2);
                dsp2(0);
                dsp3(R3);
        }                                      ⎬ ── G1
        R3=((R1<<1)|(R2>>1))+10;               ⎬ ── G2
}
```

FIG.19

```
_ASM void case3(int_reg_dest,int_reg_src,int_reg_src,int_imm,int_imm,int imm);
_ASM void case3(int R3,int R1,int imm1,int_imm2,int imm3){
        _inline{
                dsp4(imm1,imm2,imm3);
                dsp1(R1,R2);
                dsp3(R3);
        }                                      ⎬ ── H1
        R3=((R1<<imm1)|(R2>>imm2))+imm3;       ⎬ ── H2
}
```

FIG.20

```
int a[4],b,c,d,e;
void test(void){
        a[3]=(((b+c)<<7)|((d-e)>>4))+13;
        a[2]=(((b+c)<<5)|((d-e)>>3))+12;       ⎬ ── I1
        a[1]=(((b+c)<<3)|((d-e)>>2))+11;
        a[0]=(((b+c)<<1)|((d-e)>>1))+10;       ⎬ ── I2
}
```

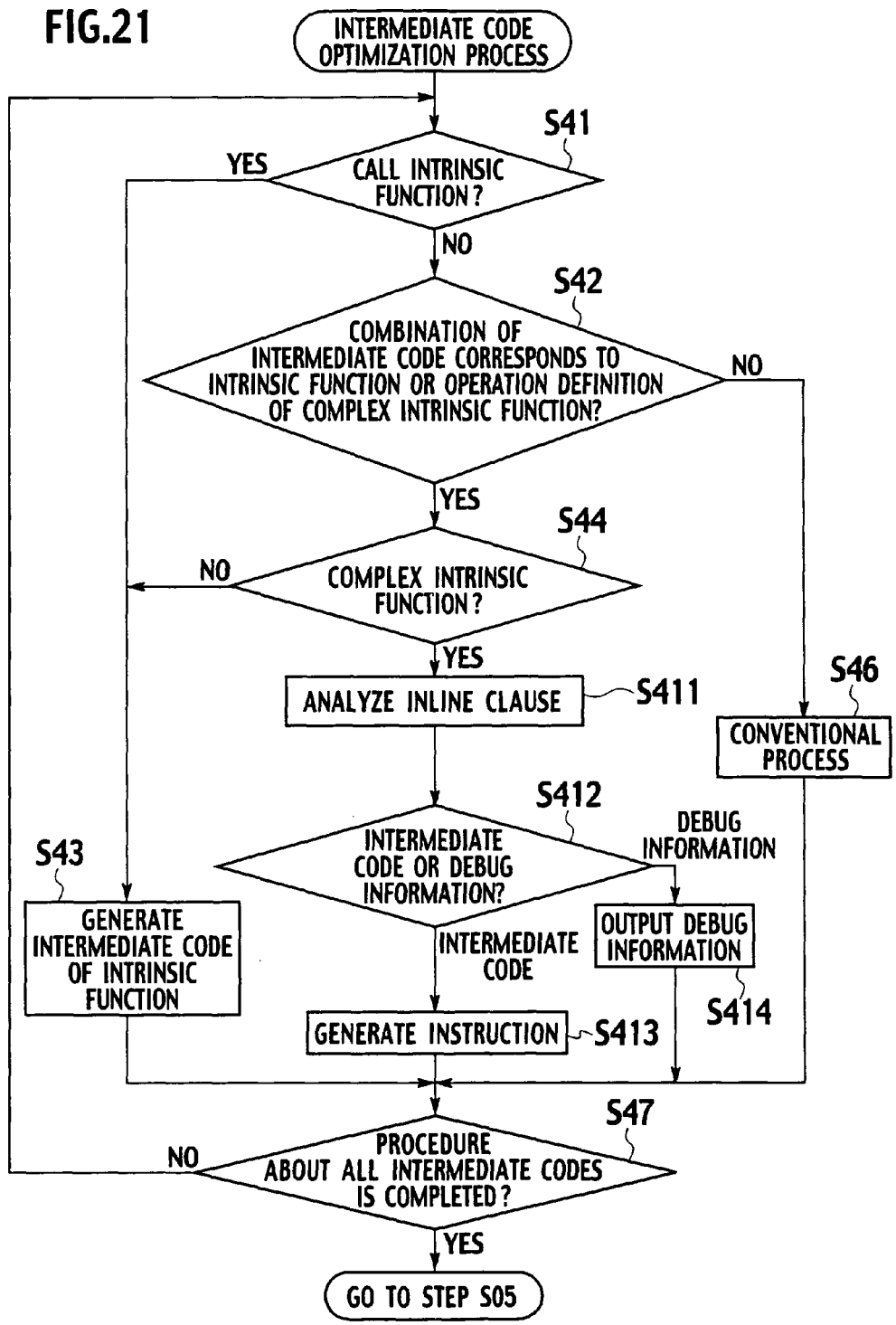

FIG.22

```
_ASM void case4(int*_reg_src,int_imm);
_ASM void case4(int*R1,int imm1){
        _inline{
                    dsp10(R1);
                    dsp11(0);
                    dsp12(15);
                    dsp13(imm1);
                    dsp14();
                    }
        int i;
        for(i=0;i<15;i++)
                    R1[i]=i+imm1;
        }
```
~ J1

```
int a[10];
void test(void){
        int i;
        for(i=0;i<15;i++)
                    a[i]=i+20;
        }
```
~ J2

FIG.23

```
BEGIN
P1(SINT)DUMMY
P0(SINT F*)DUMMY
L50000,COMPLEX_INLINE_START
LINE,4
ASMFUNC,dsp10,P0(SINT F*)
LINE,5
ASMFUNC,dsp11,#L0
LINE,6
ASMFUNC,dsp12,#L15
LINE,7
ASMFUNC,dsp13,P1(SINT)
LINE,8
ASMFUNC,dsp14
LAB,L50001
COMPLEX_INLINE_END
JMP,L50001
LAB,L50000
T1(SINT)=P1(SINT)
T0(SINT F*)=P0(SINT F*)
REPEAT #L14,L50002
LAB,L2
*T0(SINT F*)=T1(SINT)
T0(SINT F*)+=#L4
T1(SINT)+=#L1
REPEAT_E L2
LAB,L50002
COMPLEX_BEHAVIOR_END
END
```

```
x=b*c;              (1)
y=c*d+3;            (2)
return((x+y/2);     (3)
```

FIG.27

```
mul     $1,$2          (1-1)
ldc     $12,$lo        (1-2)
mul     $2,$3          (2-1)
ldc     $11,$lo        (2-2)
mov     $10,2          (3-1)
add     $11,3          (2-3)
add3    $9,$12,$11
div     $9,$10
ldc     $0,$lo
ret
```

FIG.30

```
CMOV:CRn,Rm:
1111_nnnn_mmmm_0111_1111_0000_0000_0000:
{CRn=Rm;}:;
// ------------------------------------------
CMOV:Rm,CRn:
1111_nnnn_mmmm_0111_1111_0000_0000_0001:
{Rm=CRn;}:;
// ------------------------------------------
CMAC3:CRn,CRm:
1111_nnnn_mmmm_0111_1111_0000_0000_0011:
{CRn=CRn*CRm+3;}:;
// ------------------------------------------
```

FIG.31

```
_cop int tmp_c=c;
_cop int tmp_d=d;
x=b*c;
cmac3(tmp_c,tmp_d)
y=tmp_c;
return((x+y)/2);
```

FIG.32

```
cmov     $c1,$2
cmov     $c2,$3
mul      $1,$2
+cmac3   $c1,$c2
ldc      $12,$lo
+cmov    $11,$c1
mov      $10,2
add3     $9,$12,$11
div      $9,$10
ldc      $0,$lo
ret
```

FIG.33

```
_ASM void xxx(int b,int,c,int d){
_inline{
    int x,y;
x=b*c;
    _cop int tmp_c=c;           ─╮
    _cop int tmp_d=d;            │ M1
    cmac3(tmp_c,tmp_d);          │
    y=tmp_c;                    ─╯
}
    int x,y;                    ─╮
    x=b*c;                       │ M2
    y=c*d+3;                    ─╯
}
```

PROGRAM DEVELOPMENT APPARATUS, METHOD FOR DEVELOPING A PROGRAM, AND A COMPUTER PROGRAM PRODUCT FOR EXECUTING AN APPLICATION FOR A PROGRAM DEVELOPMENT APPARATUS

CROSS REFERENCE TO RELATED APPLICATION AND INCORPORATION BY REFERENCE

This application is based upon and claims the benefit of priority from prior Japanese Patent Application P2005-055020 filed on Feb. 28, 2005; the entire contents of which are incorporated by reference herein.

BACKGROUND OF THE INVENTION

1. Field of the Invention

The present invention relates to a program development apparatus, a method for developing a program, and a computer program product for executing an application for a program development apparatus, for developing an application program to be executed by a processor configured to allow a user to extend specifications including processor architecture or instruction set.

2. Description of the Related Art

A processor configured to allow a user to extend specifications including processor architecture or instruction set has been released in recent years. By using the extensible processor, it is possible to configure instruction sets suitable for applications and to improve a processing speed of the processor. Therefore, the extensible processor is very effective for improving its performance of executing of an application. In the meantime, a compiler for compiling a program written in a high-level language into an object code (machine language) is prepared for each set of processor architecture. Therefore, the extensible processor requires a compiler that corresponds to the user specifications.

A method of using an intrinsic function defined by a user is known as a first related art for compiling a description of an instruction unique to the extensible processor. A method capable of optimizing a program description for executing a processing operation equivalent to a processing operation using an intrinsic function, into machine language corresponding to the intrinsic function, without expressly calling the intrinsic function has been disclosed as a second related art.

However, in terms of the second background art described above, a compiler can detect a statement for executing the processing operation equivalent to the processing operation using the intrinsic function, and replace a result of detection with a single instruction, but the compiler cannot replace the result of detection with multiple instructions. Although it is possible to deal with such a problem by rewriting a source program, there is a risk of low readability resulted from maintenance of portability. Therefore, it has been impossible to take full advantage of the extensible processor and to efficiently advance program developments.

SUMMARY OF THE INVENTION

An aspect of the present invention inheres in a program development apparatus including a storage device configured to store an operation definition defining a program description in a source program subjected to be optimized and a complex intrinsic function including an inline clause describing statements after the optimization, an analyzer configured to perform a syntax analysis of the complex intrinsic function by reading the complex intrinsic function out of the storage device, so as to detect the operation definition and the inline clause, and a code generator configured to generate an object code from the source program by optimizing a program description corresponding to the operation definition in the source program into the statements in the inline clause.

Another aspect of the present invention inheres in a method for developing a program including, storing an operation definition defining a program description in a source program subjected to be optimized and a complex intrinsic function including an inline clause describing statements after the optimization, performing a syntax analysis of the complex intrinsic function by reading the complex intrinsic function out of the storage device, so as to detect the operation definition and the inline clause, and generating an object code from the source program by optimizing a program description corresponding to the operation definition in the source program into the statements in the inline clause.

Still another aspect of the present invention inheres in a computer program product for executing an application for a program development apparatus, including, instructions configured to store an operation definition defining a program description in a source program subjected to be optimized and a complex intrinsic function including an inline clause describing statements after the optimization, instructions configured to perform a syntax analysis of the complex intrinsic function by reading the complex intrinsic function out of the storage device, so as to detect the operation definition and the inline clause, and instructions configured to generate an object code from the source program by optimizing a program description corresponding to the operation definition in the source program into the statements in the inline clause.

BRIEF DESCRIPTION OF THE DRAWINGS

FIG. 4A is a diagram showing an example of an intrinsic function.

FIG. 4B is a diagram of an intermediate code generated from the intrinsic function shown in FIG. 4A.

FIG. 5A is a diagram showing an example of a complex intrinsic function.

FIG. 5B is a diagram showing an intermediate code generated from the complex intrinsic function shown in FIG. 5A.

FIG. 6 is a diagram showing an example of a source program inputted to the program development apparatus according to the first embodiment of the present invention.

FIG. 7 is a diagram showing an intermediate code generated from the source program shown in FIG. 6.

FIG. 8 is a diagram showing an intermediate code in the case where the inline clause shown in FIG. 5 is expanded to the intermediate code shown in FIG. 7.

FIG. 9 is a diagram showing an object code generated from the intermediate code shown in FIG. 7.

FIG. 10 is a diagram showing an object code generated from the intermediate code shown in FIG. 8.

FIG. 15 is a flow chart showing an operation of the program development apparatus according to the first modification of the first embodiment of the present invention.

FIG. 16 is a flow chart showing a procedure of an object code optimization process according to the first modification of the first embodiment of the present invention.

FIG. 18 is a diagram showing an example of a complex intrinsic function so as to explain the intermediate code optimization process according to the second modification of the first embodiment of the present invention.

FIG. 19 is a diagram showing an example of a complex intrinsic function so as to explain the intermediate code optimization process according to the second modification of the first embodiment of the present invention.

FIG. 20 is a diagram showing an example of a source program so as to explain the intermediate code optimization process according to the second modification of the first embodiment of the present invention.

FIG. 21 is a flow chart showing a procedure of an intermediate code optimization process according to a third modification of the first embodiment of the present invention.

FIG. 22 is a diagram showing an example of a source program so as to explain the intermediate code optimization process according to a third modification of the first embodiment of the present invention.

FIG. 23 is a diagram showing an intermediate code, which is including source debug information, and is generated from the source program shown in FIG. 22.

FIG. 26 is a diagram showing an example of a source program inputted to the program development apparatus according to the second embodiment of the present invention.

FIG. 27 is a diagram showing an assembly description obtained by compiling the source program shown in FIG. 26.

FIG. 30 is a diagram showing an example of an instruction definition file generated by an instruction definition file generator according to the second embodiment of the present invention.

FIG. 31 is an example obtained by modifying the source program shown in FIG. 26.

FIG. 32 is a diagram showing an object code generated from FIG. 31.

FIG. 33 is a diagram showing an example of a complex intrinsic function generated by a very long word (VLIW) instruction definer according to the second embodiment of the present invention.

DETAILED DESCRIPTION OF THE INVENTION

Figure 1:
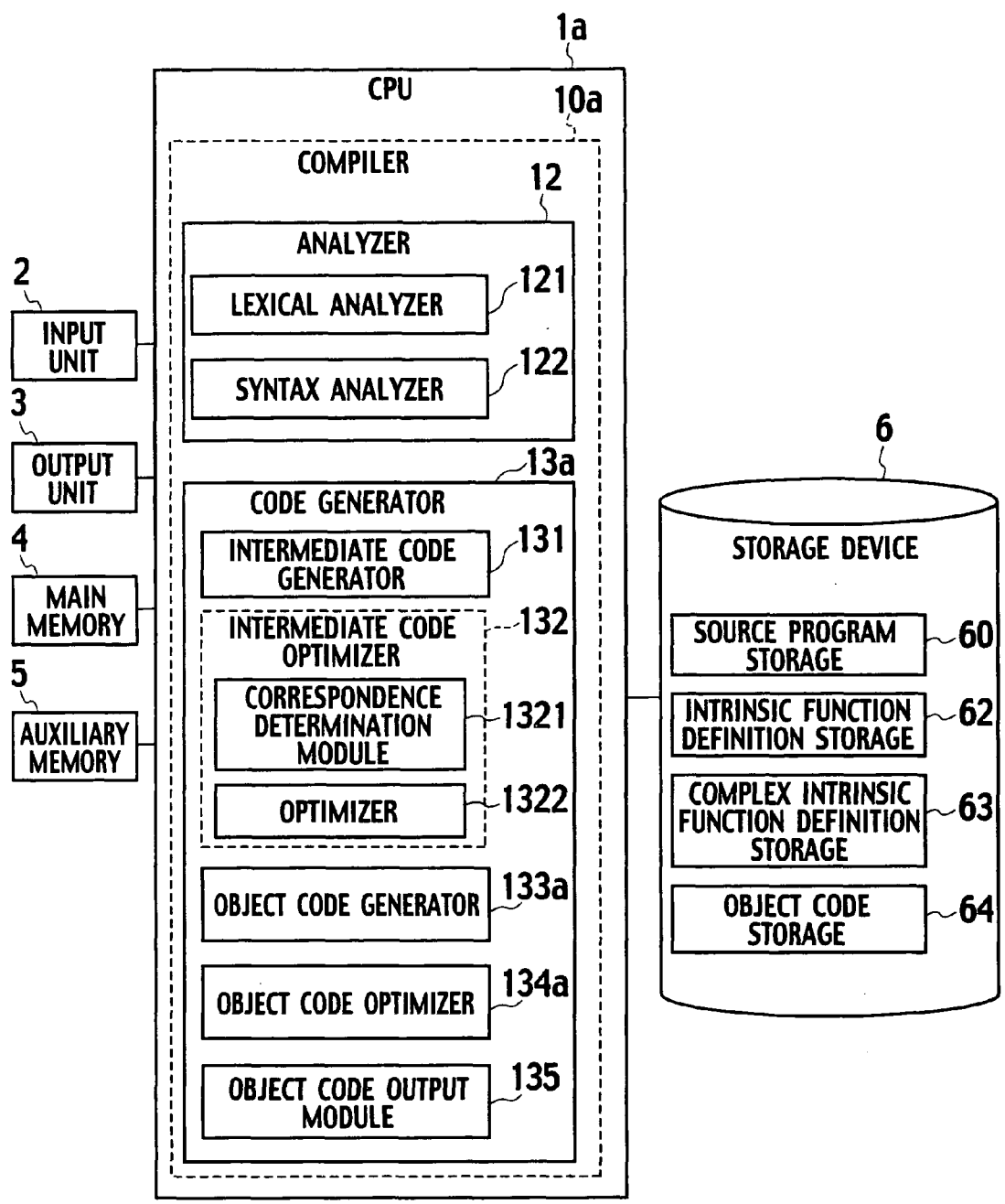
FIG. 1 is a block diagram showing an example of an arrangement of a program development apparatus according to a first embodiment of the present invention.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

First Embodiment

As shown in FIG. 1, a program development apparatus according to a first embodiment of the present invention includes a central processing unit (CPU) 1a, an input unit 2, an output unit 3, a main memory, an auxiliary memory 5, and a storage device 6. The CPU 1a realizes a function of a compiler 10a for compiling a source program written in a high-level language such as the C language, into an object code (machine language). The following example describes the case where the source program is written in the C language. Moreover, the compiler 10a includes an analyzer 12 and a code generator 13a. In addition, a storage device 6 includes a source program storage 60, an intrinsic function definition storage 62, a complex intrinsic function definition storage 63, an object code storage 64, and the like. A complex intrinsic function including an operation (behavior) definition defining a program description subjected to be optimized in the source program, and an inline clause describing statements after optimization, are stored in the source program storage 60 as a part of the source program. The analyzer 12 of the compiler 10a reads the complex intrinsic function out of the source program storage 60, performs a syntax analysis of the complex intrinsic function, and detects the operation definition and the inline clause. The code generator 13a of the compiler 10a optimizes the program description corresponding to the operation definition in the source program into the statements in the inline clause, and generates an object code out of the source program.

Figures 2A, 2B, 2C, 2D, 3:
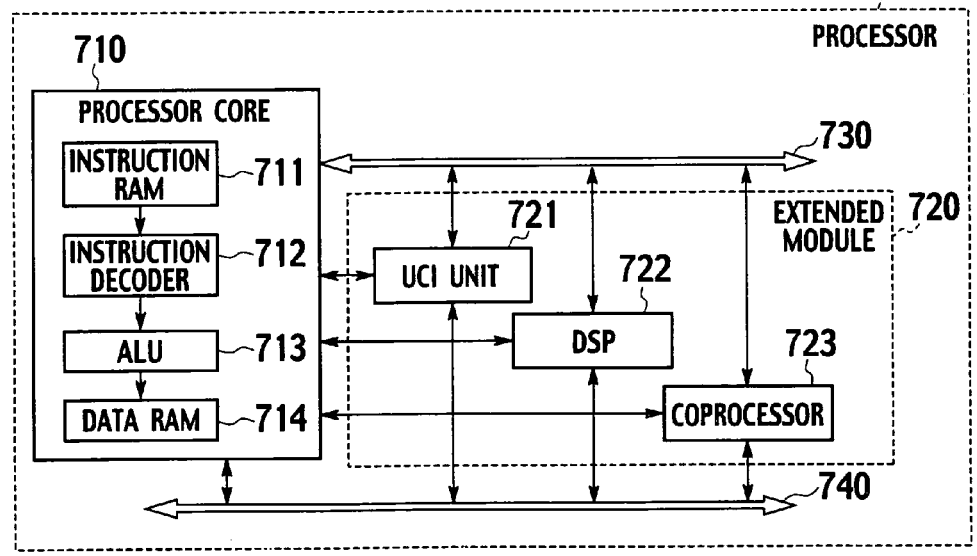
FIG. 2A is a diagram showing an example of the description of a complex intrinsic function.
FIG. 2B is a diagram showing an example of a description of an intrinsic function.
FIG. 2C is a diagram showing an example of a description of an inline clause described in FIG. 2A.
FIG. 2D is a diagram showing an example of a description of an operation definition described in FIG. 2A and FIG. 2B.
FIG. 3 is a block diagram showing an example of an arrangement of a processor subjected to develop a program by the program development apparatus according to the first embodiment of the present invention.

Meanwhile, the source program storage 60 stores a source program and any one of an intrinsic function or a complex intrinsic function defined by a user, or both of the intrinsic function and the complex intrinsic function in advance. The intrinsic function and the complex intrinsic function are stored as header files of the source program. Here, the complex intrinsic function is described in a format (a grammar) as shown in FIG. 2A. On the contrary, the intrinsic function is described in a format as shown in FIG. 2B. The complex intrinsic function shown in FIG. 2A is different from the intrinsic function shown in FIG. 2B in that it can designate "_ASM" as a modifier and that it designates an inline clause as the function itself.

The program description corresponding to the operation definition shown in FIG. 2A is detected in the source program, the code generator 13a shown in FIG. 1 optimizes the program description corresponding to the operation definition into the statements in the inline clause, i.e., into a "sequence of statements" shown in FIG. 2C. In this way, it is possible to optimize the program description corresponding to the operation definition in the source program into multiple instructions. Meanwhile, the inline clause is described in a format as shown in FIG. 2C. The operation definition is described in a format as shown in FIG. 2D.

On the contrary, the program description corresponding to the operation definition shown in FIG. 2B is detected; the code generator 13a optimizes the program description corresponding to the operation definition into an intrinsic function name (a declarator). As a result, the program description corresponding to the operation definition in the source program is optimized into a single user-defined instruction.

Meanwhile, a function name of the intrinsic function, the operation definition of the intrinsic function, and the like detected by the analyzer 12 are stored in the intrinsic function definition storage 62 shown in FIG. 1. The statements in the inline clause of the complex intrinsic function, the operation definition of the complex intrinsic function, and the like detected by the analyzer 12 are stored in the complex intrinsic function definition storage 63. The object code generated by the code generator 13a is stored in the object code storage 64.

In addition, the program development apparatus shown in FIG. 1 defines a processor 70 shown in FIG. 3 as target hardware. The processor 70 shown in FIG. 3 for instance includes a processor core 710, an extended module 720, a control bus 730, a data bus 740, and the like. An application program (firmware) developed by the program development apparatus shown in FIG. 1 is stored in a program memory (not shown) outside the processor 70. The processor core 710 read the application program out of the program memory. The application program read out is temporarily stored in an instruction random access memory (RAM) 711 inside the processor core 710.

In terms of the application program stored in the program memory, statements including one instruction or multiple instructions optimized by the code generator 13a shown in FIG. 1 using the intrinsic function or the complex intrinsic function is transferred from the instruction RAM 711 to the extended module 720 and is executed by the extended module 720. Any of a user custom instruction (UCI) unit 721, a digital signal processor (DSP) 722, a coprocessor 723, and the like, or a combination of any of those constituents is embedded in the extended module 720 in accordance with a targeted performance, contents of processing, and the like. Meanwhile, in addition to the instruction RAM 711, the processor core 710 includes an instruction decoder 712, an arithmetic and logic unit (ALU) 713, a data RAM 714, and the like.

When the UCI unit 721 is embedded in the extended module 720, the intrinsic function may be stored in the source program storage 60, with setting the program description stored in the source program in the source program storage 60 shown in FIG. 1, and subjected to be executed by the UCI unit 721, as a definition of the operation of the intrinsic function, for example. As a result, the compiler 10a converts the source program into the object code and selectively generates the instruction to be executed by the UCI unit 721, at the same time. At the execution, the instruction to be executed by the UCI unit 721 is temporarily stored in the instruction RAM 711 of the processor core 710, and is transferred to the UCI unit 721.

Moreover, when the DSP 722 or the coprocessor 723 is embedded in the extended module 720, the complex intrinsic function may be stored in the source program storage 60 as a part of the source program, which includes the statements targeted to the DSP722 or the coprocessor 723 in the inline clause, by defining the program description to be executed by the DSP722 or the coprocessor 723 in the source program, as the definition of the operation of the intrinsic function shown in FIG. 2A, for example. As a result, the compiler 10a converts the source program into the object code and selectively generates the statements automatically to be executed by the DSP 722 or the coprocessor 723. At the execution, the statements to be executed by the DSP 722 or the coprocessor 723, is temporarily stored in the instruction RAM 711 of the processor core 710, and is transferred to any of the DSP 722 or the coprocessor 723 as appropriate.

In this way, it is possible to improve a processing speed of the entire processor 70 as the extended module 720 reduces loads on the processor core 710. Moreover, when configuration of the extended module 720 is added or modified, it is possible to deal with that change by adding or modifying the relevant complex intrinsic function and the intrinsic function. Accordingly, it is not necessary to rewrite the source program. Therefore, it is possible to maintain readability of the source program. In addition, it is also possible to avoid an increase in a program development period attributed to addition or modification of the configuration of the extended module 720.

Moreover, the analyzer 12 shown in FIG. 1 includes a lexical analyzer 121 and a syntax analyzer 122. The lexical analyzer 121 reads a header file including the intrinsic function or the complex intrinsic function and the source program out of the source program storage 60, for example. The analyzer 12 divides the source program and the header file into tokens, which are minimum units having meanings. The tokens typically include a keyword of the programming language, an operator, a name of a variable, a constant, a separator, and the like.

The syntax analyzer 122 checks whether or not the statement divided into the tokens such as the name of the variable and codes compliant with a grammatical rule defined by the programming language. Meanwhile, the syntax analyzer 122 detects the intrinsic function or the complex intrinsic function from the statement divided into the tokens or a combination of the statements. When the intrinsic function is detected, the function name of the intrinsic function, the operation definition, and the like are stored in the intrinsic function definition storage 62. Meanwhile, when the complex intrinsic function is detected, the inline clause of the complex intrinsic function, the operation definition, and the like are stored in the complex intrinsic function definition storage 63.

For example, when an intrinsic function shown in FIG. 4A is included in the source program storage 60, the syntax analyzer 122 stores a operation definition "a=(a+10)|b", a function name of the intrinsic function "uci", and other definitions in the intrinsic function definition storage 62. Meanwhile, when a complex intrinsic function shown in FIG. 5A is included in the source program storage 60, the syntax analyzer 122 stores a operation definition "R3=((R1<<1)|(R2>>1))+10", statements "dsp1(R1,R2) dsp2(0), dsp3(R3)" in the inline clause, and other definitions in the complex intrinsic function definition storage 63. Meanwhile, the statements "dsp1(R1,R2) dsp2(0) dsp3(R3)" in the inline clause shown in FIG. 5A is executed by the DSP 722 shown in FIG. 3, for example.

Further, an intermediate code generator 131 shown in FIG. 1 converts the source program after the syntax analysis into an intermediate code that is a simple description equivalent to the source program. Here, the intermediate code is generated because there may be a case where the program generated as a result of generation of the object code immediately after the syntax analysis increases the size and therefore impedes efficient conversion processing.

Meanwhile, the intermediate code generator 131 converts the operation definition of the intrinsic function and the function name of the intrinsic function stored in the intrinsic function definition storage 62 into intermediate codes as shown in FIG. 4B. As a result, an intermediate code A1 representing the name of the intrinsic function and an intermediate code A2 representing the operation definition are generated.

Similarly, the intermediate code generator 131 converts the operation definition of the complex intrinsic function and the statements in the inline clause stored in the complex intrinsic function definition storage 63 into intermediate codes as shown in FIG. 5B. As a result, an intermediate code B1 representing the statements in the inline clause and an intermediate code B2 representing the operation definition are generated.

As shown in FIGS. 4B and 5B, each of the function name of the intrinsic function and the inline clause of the complex intrinsic function is sandwiched by a virtual branch instruction "COMPLEX_INLINE_START" to the operation definition and "COMPLEX_INLINE_END" indicating an end of the function name or the inline clause. By placing an instruction of unconditional branch to "COMPLEX_IN-LINE_END" immediately after the statement "COMPLEX_INLINE_END" indicating the end of the inline clause, it is possible to separate the inline clause from the operation definition completely when a data flow analysis is executed. Therefore, it is possible to check whether or not there is a contradiction between an attribute of an operand and a content of definition in a single path.

Moreover, the intermediate code generator 131 includes a correspondence determination module 1321 and an optimizer 1322 as shown in FIG. 1. The correspondence determination module 1321 detects the intermediate code corresponding to the operation definition of the intrinsic function or the complex intrinsic function. When the intermediate code corresponding to the operation definition of the intrinsic function is detected, the optimizer 1322 optimizes the intermediate code corresponding to the operation definition of the intrinsic function into the function name of the intrinsic function. On the contrary, when the intermediate code corresponding to the operation definition of the complex intrinsic function is detected, the optimizer 1322 optimizes the intermediate code corresponding to the operation definition of the complex intrinsic function into the statements in the inline clause.

For example, when intermediate codes shown in FIG. 7 are generated based on a source program shown in FIG. 6, the correspondence determination module 1321 compares operands "P0", "P1", and "P2" for the intermediate code B2 of the operation definition shown in FIG. 5B with variables "T1", "T10", and "T5" in FIG. 7, and thereby it is determined that the intermediate code B2 of the operation definition shown in FIG. 5B corresponds to an intermediate code C1 in FIG. 7.

When it is determined by the correspondence determination module 1321 that the intermediate code B2 of the operation definition shown in FIG. 5B corresponds to the intermediate code C1 in FIG. 7, the optimizer 1322 replaces the intermediate code C1 in FIG. 7 with the intermediate code B1 of the inline clause shown in FIG. 5B, and at the same time, assigns "T1", "T10", and "T5" to "P0", "P1", and "P2" of the intermediate code B2 of the operation definition shown in FIG. 5B, respectively. As a result, an intermediate code D1 after optimization is generated as shown in FIG. 8.

An object code generator 133a shown in FIG. 1 generates an object code using optimized intermediate code. To be more precise, the object code generator 133a receives the results of division of the source program into the minimum units, the check on the syntax error, and the like carried out beforehand, and converts the intermediate code into the object code by use of a code generator function.

An object code optimizer 134a modifies the object code generated by the object code generator 133a in order to improve actual processing efficiency. An object code output module 135 outputs (stores) the object code to (in) the object code storage 64.

The object code generated from the intermediate code shown in FIG. 7 is described as shown in FIG. 9. On the contrary, the object code generated from the intermediate code shown in FIG. 8 is described as shown in FIG. 10. Statements E1 including five instructions as shown in FIG. 9 is optimized into statements F1 including three instructions as shown in FIG. 10.

Meanwhile, the operation definition "R3=((R1<<1)|(R2>>1))+10" detected in the source program is replaced with the single instruction in the case of using the intrinsic function. On the contrary, by using the complex intrinsic function, it is possible to be replaced with three statements "dsp1(R1,R2) dsp2(0), dsp3(R3)".

The program development apparatus shown in FIG. 1 includes a database controller and an input/output (I/O) controller (not illustrated). The database controller provides retrieval, reading, and writing to the storage device 6. The I/O controller receives data from the input unit 2, and transmits the data to the CPU 1a. The I/O controller is provided as an interface for connecting the input unit 2, the output unit 3, the auxiliary memory 5, a reader for a memory unit such as a compact disk-read only memory (CD-ROM), a magneto-optical (MO) disk or a flexible disk, or the like to CPU 1a. From the viewpoint of a data flow, the I/O controller is the interface for the input unit 2, the output unit 3, the auxiliary memory 5 or the reader for the external memory with the main memory 4. The I/O controller receives a data from the CPU 1a, and transmits the data to the output unit 3 or auxiliary memory 5 and the like.

A keyboard, a mouse or an authentication unit such as an optical character reader (OCR), a graphical input unit such as an image scanner, and/or a special input unit such as a voice recognition device can be used as the input unit 2 shown in FIG. 1. A display such as a liquid crystal display or a cathode-ray tube (CRT) display, a printer such as an ink-jet printer or a laser printer, and the like can be used as the output unit 3. The main memory 4 includes a read only memory (ROM) and a random access memory (RAM). The ROM serves as a program memory or the like which stores a program to be executed by the CPU 1a. The RAM temporarily stores the program for the CPU 1a and data which are used during execution of the program, and also serves as a temporary data memory to be used as a work area.

Next, a procedure of the program development apparatus according to the first embodiment will be described by referring a flow chart shown in FIG. 11.

In step S00, the lexical analyzer 121 reads the source program out of the source program storage 60, and reads the header file out of the header file storage 61.

In step S01, the lexical analyzer 121 executes the lexical analysis to the source program and the header file.

In step S02, the syntax analyzer 122 executes the syntax analysis to the result of the lexical analysis of the lexical analyzer 121. As a result, the function name and operation definition of the intrinsic function are detected. The statements and the operation definition in the inline clause in complex intrinsic function are detected. The syntax analyzer 122 stores the function name and the operation definition of the intrinsic function into the intrinsic function definition storage 62, and stores the statements and the operation definition in the inline clause in the complex intrinsic function into the complex intrinsic function definition storage 63. Detailed procedure of the syntax analyzer 122 will be explained later.

In step S03, the intermediate code generator 131 converts the source program after the syntax analysis into the intermediate code. The intermediate code generator 131 reads the function name and the operation definition of the intrinsic function out of the intrinsic function definition storage 62, and converts into an intermediate code. Similarly, the intermediate code generator 131 reads the statements and the operation definition in the inline clause in the complex intrinsic function out of complex intrinsic function definition storage 63, and converts into an intermediate code.

In step S04, the intermediate code optimizer 132 executes an optimization to the intermediate code of the source code generated in step S03 by utilizing the intermediate code of the intrinsic function and the complex intrinsic function. Detailed procedure of the intermediate code optimizer 132 will be explained below.

In step S05, the object code generator 133a converts the intermediate code after the optimization into an object code.

In step S06, the object code optimizer 134a optimizes the object code generated in step S05.

In step S07, the object code output module 135 stores the optimized object code into the object code storage 64.

Figure 12:
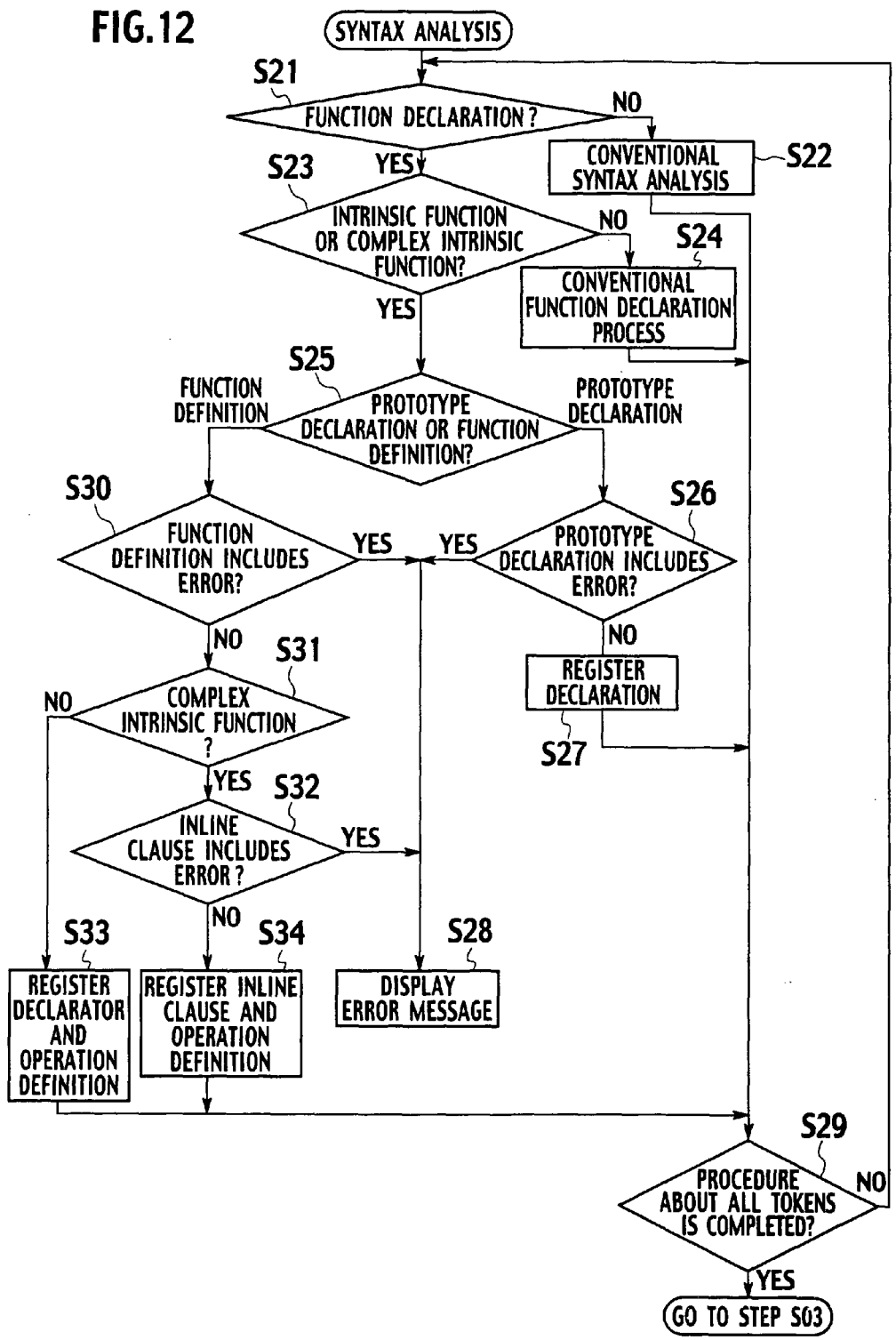
FIG. 12 is a flow chart showing a procedure of a syntax analysis process according to the first embodiment of the present invention.

Next, a detailed procedure of the syntax analysis process will be described by referring a flow chart shown in FIG. 12.

In step S21, the syntax analyzer 122 determines whether an inputted token is a function declaration. It is determined that the inputted token is a function declaration, the procedure goes to step S23. It is determined that the inputted token is not a function declaration, the procedure goes to step S22, and then the syntax analyzer 122 executes a conventional syntax analysis process.

In step S23, the syntax analyzer 122 determines whether the function declaration is a declaration of an intrinsic function or a complex intrinsic function. In an example shown in FIGS. 2A and 2B, when an original reserved word "_asm" or "_ASM" is added to the function declaration, it is determined that the function declaration is a user defined intrinsic function or complex intrinsic function, and then the procedure goes to step S25. When the reserved word "_asm" or "_ASM" is not added to the function declaration, the procedure goes to step S24, and then a conventional function declaration process is executed.

In step S25, the syntax analyzer 122 determines whether a declaration of the intrinsic function or the complex intrinsic function is a prototype declaration or a function definition. Here, "prototype declaration" refers to a definition of a name of type information of formal parameter or an identifier in the user defined intrinsic function, and a declaration of the intrinsic function or the complex intrinsic function without the operation definition. It is determined that the declaration is the prototype declaration, the procedure goes to step S26. It is determined that the declaration is the function definition, the procedure goes to step S30.

In step S26, the syntax analyzer 122 interprets type information and an identifier name of a formal parameter of the intrinsic function or the complex intrinsic function, and determines whether a designation manner of the type information and the identifier name of the formal parameter include an error. As a result of the determination, when a designation manner of the type information and the identifier name of the formal parameter do not include an error, the definition of the user defined intrinsic function or the complex intrinsic function is stored in the intrinsic function definition storage 62 or the complex intrinsic function definition storage 63 in step S27. When the type information or the identifier name of the designation manner includes an error, an error message is displayed in step S28.

In step S23, the syntax analyzer 122 interprets type information and an identifier name of the formal parameter of the intrinsic function or the complex intrinsic function, and determines that the designation manner of the type information and the identifier name of the formal parameter include an error, and determines that the operation definition of the intrinsic function or the complex intrinsic function includes an grammatical error. As the result of the determination, when the designation manner or the operation definition of type information and identifier name of the formal parameter includes an error, an error message is displayed in step S28. When the designation manner or the operation definition of type information and identifier name of the formal parameter does not include an error, the procedure goes to step S31.

In step S31, the syntax analyzer 122 determines whether the function definition is the function definition of an intrinsic function or a function definition of the complex intrinsic function. In an example of FIGS. 2A and 2B, when the reserved word "_asm" is added, the procedure goes to step S33, and then the function name and the operation definition of the intrinsic function is stored in the intrinsic function definition storage 62. When the reserved word "_ASM" is added, the procedure goes to step S32.

In step S32, the syntax analyzer 122 determines whether the description of the inline clause of the complex intrinsic function includes an error. The procedure goes to step S28 when it is determined that the description of the inline clause includes an error. Then an error message is displayed. The procedure goes to step S34 when it is determined that the description of the inline clause does not include an error. Then the statements and the operation definition in the inline clause of the complex intrinsic function are stored in the complex intrinsic function definition storage 63.

In step S29 after steps S22, S24, S27, S33, or S34, it is determined that the syntax analysis about all tokens is finished. The syntax analysis process is completed when it is determined that the syntax analysis about all tokens is finished. The procedure returns to step S21 when the syntax analysis about all tokens is not finished.

Figure 13:
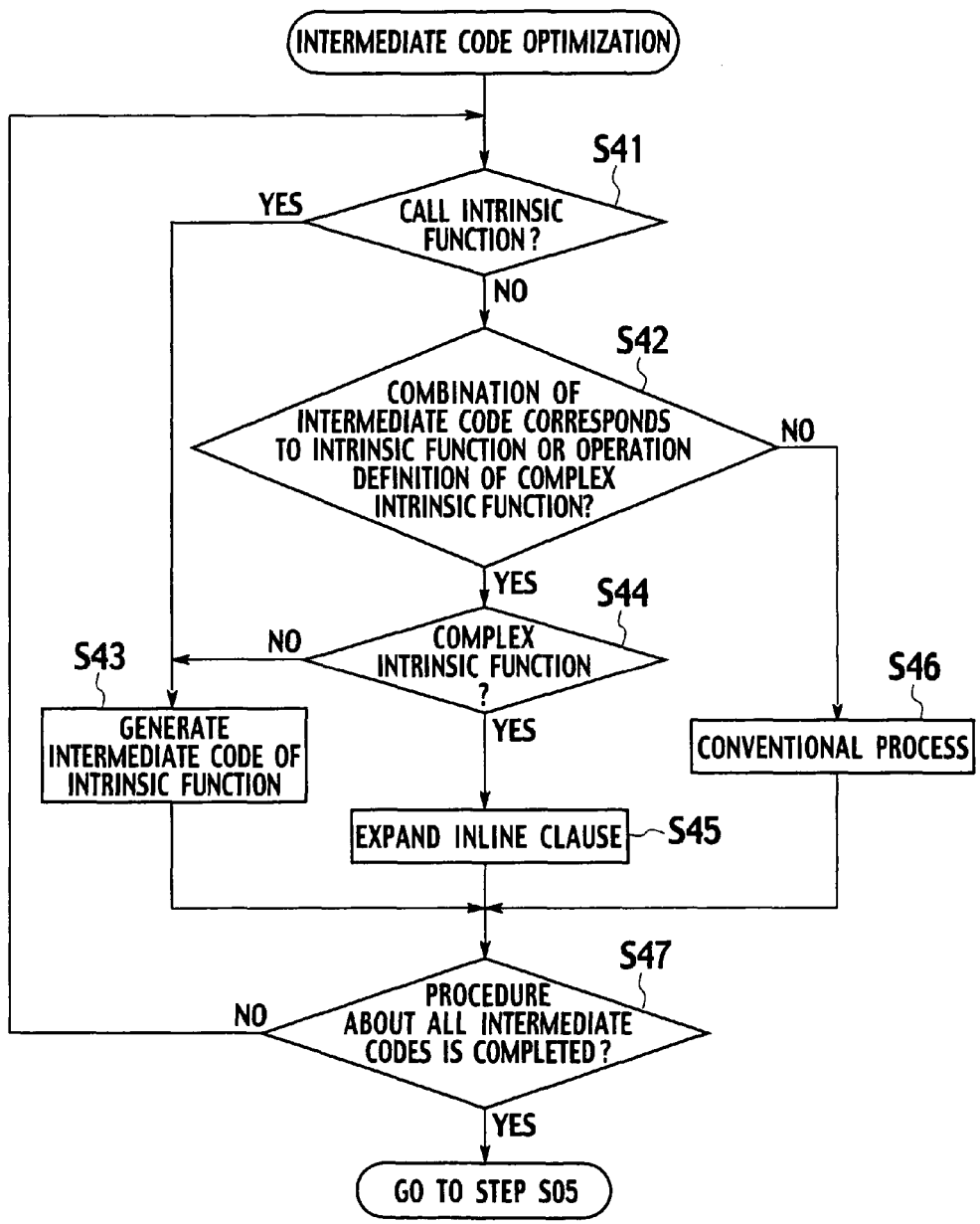
FIG. 13 is a flow chart showing a procedure of an intermediate code optimization process according to the first embodiment of the present invention.

Next, detailed procedure of the intermediate code optimization process will be described by referring a flow chart shown in FIG. 13.

In step S41, the intermediate code optimizer 132 determines whether an intermediate code generated by the intermediate code generator 131 is an expressive call of the intrinsic function. In the example of the intrinsic function shown in FIG. 4A, "expressive call" refers to a case where a term "uci" is directly described in the source program. The procedure goes to step S43 when it is determined that the intermediate code is an expressive call of an intrinsic function. The procedure goes to step S42 when it is determined that the intermediate code is not an expressive call of an intrinsic function.

In step S42, a correspondence determination module 1321 of the intermediate code optimizer 132 determines whether a combination of the intermediate codes corresponds with an operation definition of the intrinsic function or the complex intrinsic function. The procedure goes to step S44 when it is determined that a combination of the intermediate codes corresponds with an operation definition of the intrinsic function or the complex intrinsic function. The procedure goes to step S46 and then a conventional intermediate code process is executed when it is determined that a combination of the intermediate codes does not correspond with an operation definition of the intrinsic function or the complex intrinsic function.

In step S44, it is determined whether a combination of the intermediate codes corresponding to the operation definition of the intrinsic function or the complex intrinsic function is an operation definition of the complex intrinsic function. The procedure goes to step S45 when it is determined that the combination is the operation definition of the complex intrinsic function. Then the optimizer 1322 optimizes the combination into statements (intermediate code) of the inline clause. The procedure goes to step S43 when it is determined that the combination is not the operation definition of the complex intrinsic function. In step S43, the optimizer 1322 optimizes the combination into intermediate codes of the intrinsic function.

In step S47 after steps S43, S45, or S46, the intermediate code optimizer 132 determines whether the optimization process about all intermediate codes is finished. When it is determined that the optimization process about all intermediate codes is finished, the intermediate code optimization process is completed. The procedure returns to step S41 when it is determined that the optimization process about all intermediate codes is not finished.

As described above, according to the first embodiment, it is possible to generate the object code suitable for the target hardware without rewriting the source program. That is, in the compiling process, it is possible to perform optimization by replacing a source program with a different source program including specific statements that depends on the target hardware. Therefore, it is possible to replace a specific program description in the source program not only with a single instruction but also with statements including multiple instructions.

First Modification of First Embodiment

Figure 14:
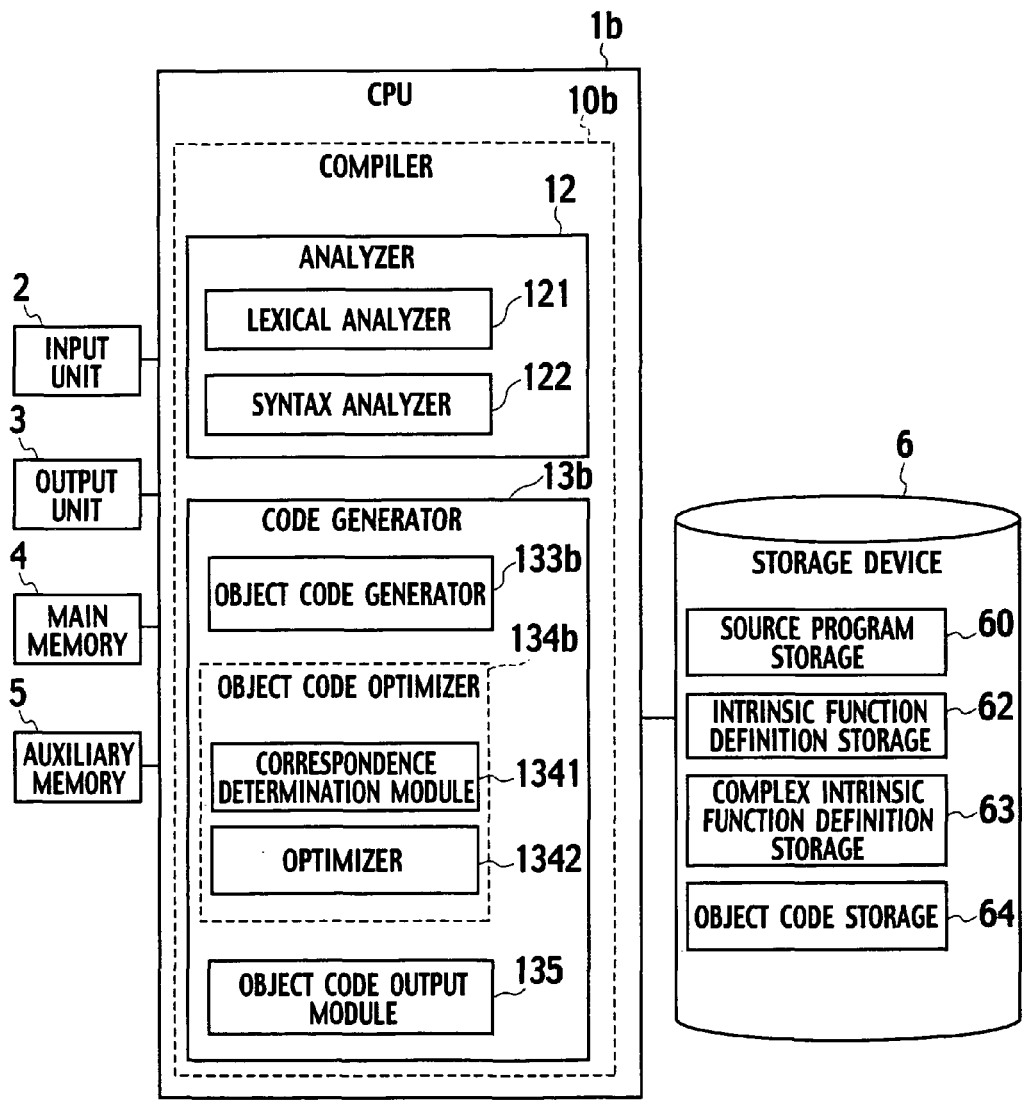
FIG. 14 is a block diagram showing an example of an arrangement of a program development apparatus according to a first modification of the first embodiment of the present invention.

As shown in FIG. 14, a program development apparatus according to a first modification of the first embodiment of the present invention is configured to directly generate an object code from a source program without generating an intermediate code.

The object code generator 133b converts a source program after a syntax analysis into an object code. The object code optimizer 134b executes optimization to the generated object code by utilizing the intrinsic function and the complex intrinsic function. Other arrangements are similar to FIG. 1.

Figure 11:
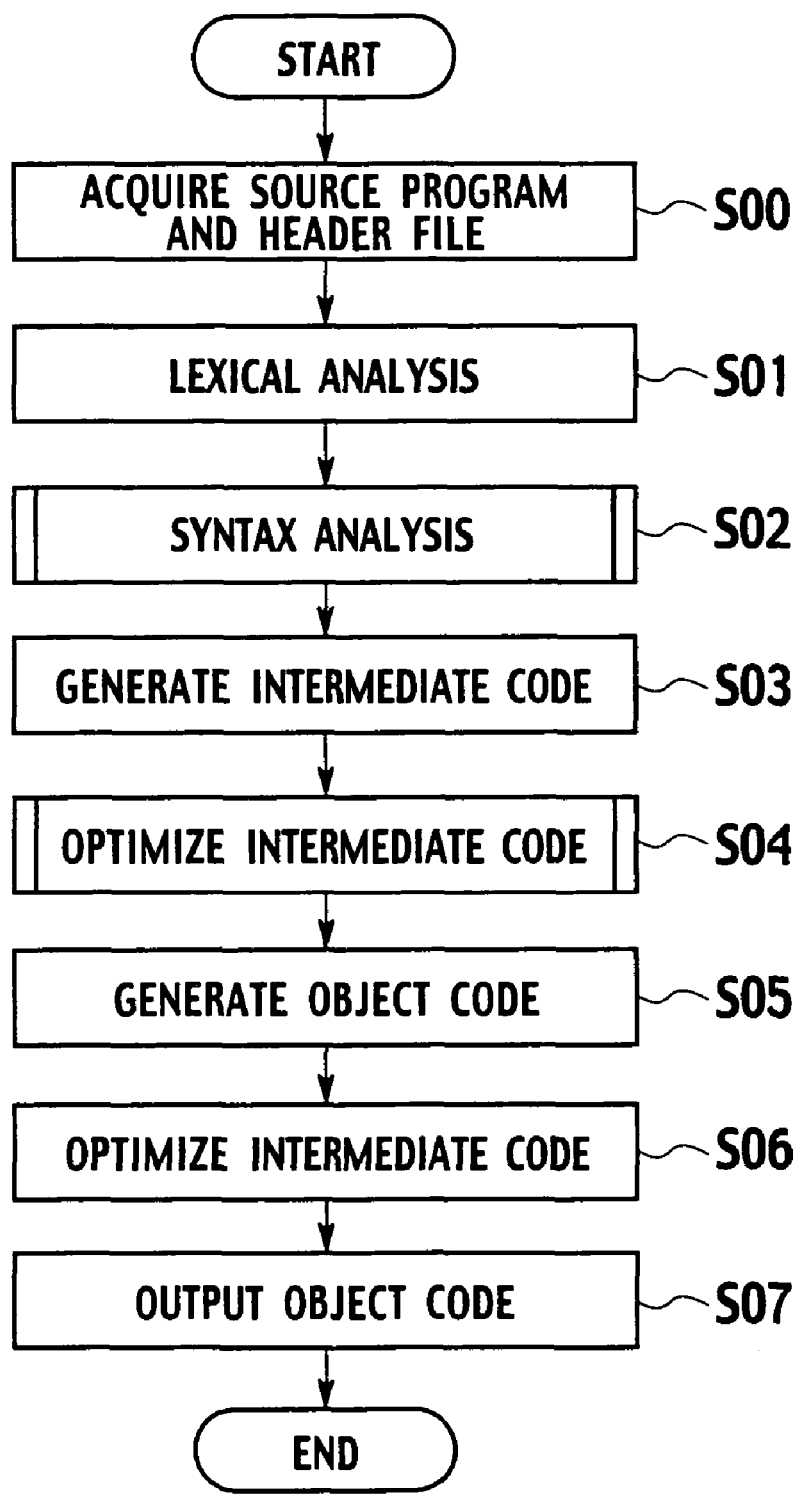
FIG. 11 is a flow chart showing an operation of the program development apparatus according to the first embodiment of the present invention.

As shown in FIG. 15, the program development apparatus shown in FIG. 14 does not executes the intermediate code generating step (step S03) and the intermediate code optimization process (step S04) shown in FIG. 11.

The object code optimizer 134b executes a correspondence determination between the object code (machine language) and intrinsic or complex intrinsic functions, as shown in FIG. 16. Specifically, in step S62 of FIG. 16, a correspondence determination module 1341 of the object code optimizer 134b detects a machine language sequence corresponding to the operation definition of the intrinsic function or the complex intrinsic function.

When a machine language sequence corresponding to the operation definition of the intrinsic function is detected, the optimizer 1342 optimizes the machine language sequence corresponding to the operation definition of the intrinsic function into the function name of the intrinsic function at step S63 of FIG. 16.

When a machine language sequence corresponding to the operation definition of the complex intrinsic function is detected, the optimizer 1342 optimizes the machine language sequence corresponding to the operation definition of the complex intrinsic function into the statements in the inline clause of the intrinsic function at step S65 of FIG. 16. Other processes are similar to FIG. 13.

The program development apparatus according to the first modification of the first embodiment can simplify the arrangements of the compiler 10b because an intermediate code is not generated.

Second Embodiment of First Embodiment

Figure 17:
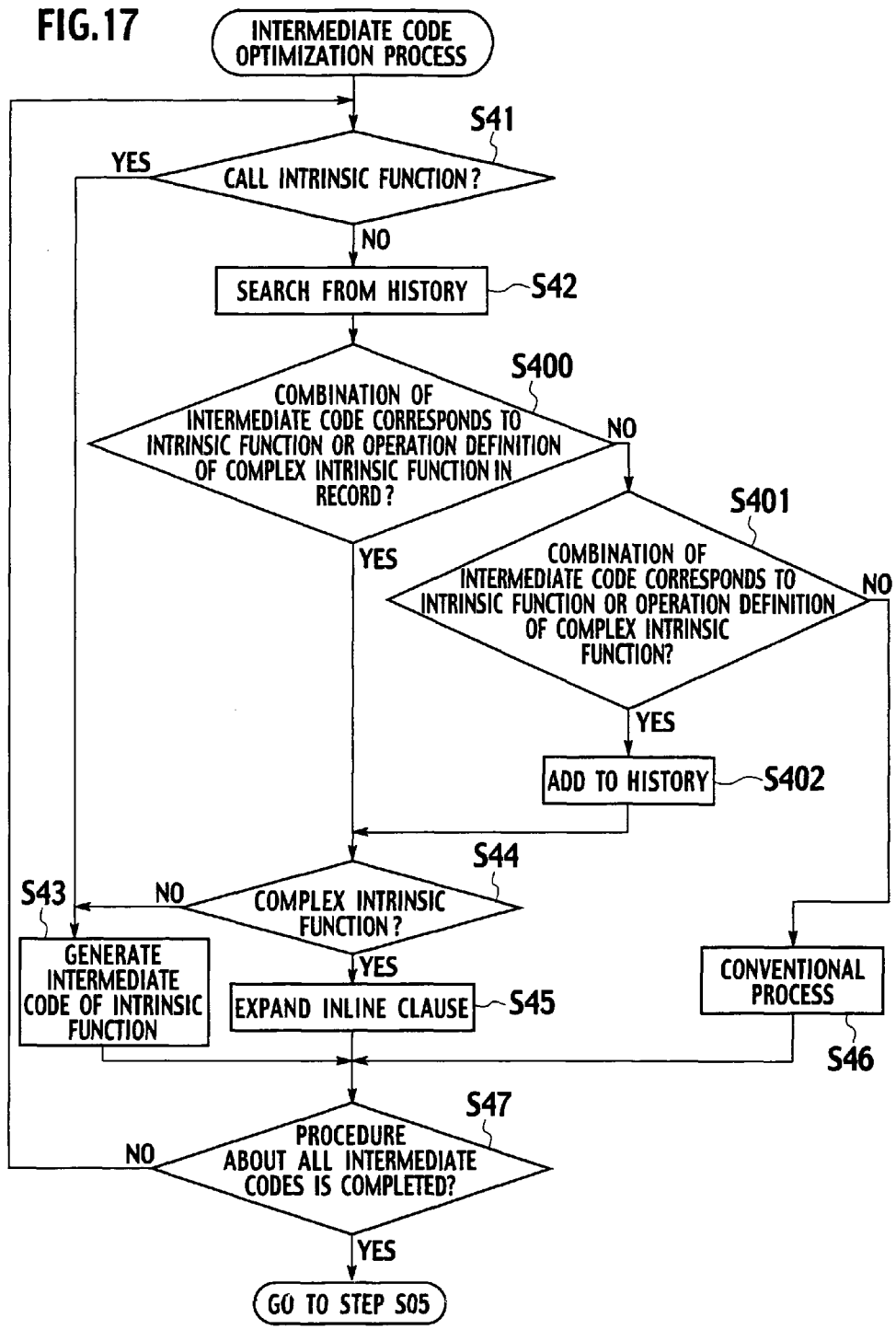
FIG. 17 is a flow chart showing a procedure of an intermediate code optimization process according to a second modification of the first embodiment of the present invention.

As shown in FIG. 17, the intermediate code optimizer 132 of FIG. 1 may generate a history of a complex intrinsic function utilized for the optimization, and preferentially use the complex intrinsic function existing in the history, as a second modification of the first embodiment of the present invention.

Furthermore, the intermediate code optimizer 132 may generate a history of not only the complex intrinsic function but also an intrinsic function utilized for the optimization, and preferentially use an intrinsic function existing in the history. The history of the complex intrinsic function utilized for the optimization is stored in the complex intrinsic function definition storage 63 shown in FIG. 1, for instance. The history of the intrinsic function utilized for the optimization is stored in the intrinsic function definition storage 62 shown in FIG. 1, for instance.

In step S400 of FIG. 17, the intermediate code optimizer 132 determines whether a combination of intermediate codes corresponds with the operation definition of the intrinsic function or the complex intrinsic function existing in the history. When it is determined that the combination of intermediate codes does not corresponds with the operation definition of the intrinsic function or the complex intrinsic function existing in the history, the procedure goes to step S401. In step S401, the intermediate code optimizer 132 determines whether combination of intermediate code corresponds with the operation definition of the intrinsic function or the complex intrinsic function.

In step S402, the intermediate code optimizer 132 adds the intrinsic function or the complex intrinsic corresponding to the operation definition to the history. Other processes are similar to FIG. 13.

When a complex intrinsic function "case2" shown in FIG. 18 and a complex intrinsic function "case3" shown in FIG. 19 are stored in the header file storage 61, the operation definitions G2 and H2 are similar each other. When a source program shown in FIG. 20 is stored in the source program storage 60, three statements in program description I1 in the source program correspond with the operation definition H2 of the complex intrinsic function "case3".

However, the program description I2 of the source program corresponds with the operation definitions G2 and H2 of the complex intrinsic functions "case2" and "case3". When a restriction for selecting one of the complex intrinsic functions "case2" and "case3" does not exist, there is a possibility of optimizing the program description I2 into the complex intrinsic function "case2".

Accordingly, in the second modification of the first embodiment, the complex intrinsic function "case3" utilized in the past is selected by referring to the history of the complex intrinsic function. As a result, with respect to the source program shown in FIG. 20, hardware for executing the instruction "dsp2" that is only utilized for the inline clause G1 of the complex intrinsic function "case2" becomes unnecessary.

As described above, it is possible to reduce the variation of the complex intrinsic function and the intrinsic function for the optimization because precedence of selecting the complex intrinsic function and the intrinsic function is set. Therefore, it is possible to reduce the hardware scale of the target hardware because hardware for executing the statements (instructions) in the inline clause of complex intrinsic function that is not utilized for the optimization, and for executing the intrinsic function that is not utilized for the optimization becomes unnecessary.

In the example described above, although intermediate code optimizer 132 generates the history, the object code optimizer 134b generates the history when an arrangement of the program development apparatus shown in FIG. 14 is applied.

Third Modification of First Embodiment

As shown in FIG. 21, the intermediate code optimizer 132 of FIG. 1 may selectively generate source debug information, as a third modification of the first embodiment of the present invention. A line number can be utilized as the debug information, for instance.

The optimizer 1322 shown in FIG. 1 analyzes the inline clause at step S411 of FIG. 21, and detects the debug information at step S411. As shown in steps S413 and S414, the optimizer 1322 adds the debug information to intermediate code sequence of inline clause.

Figure 24:
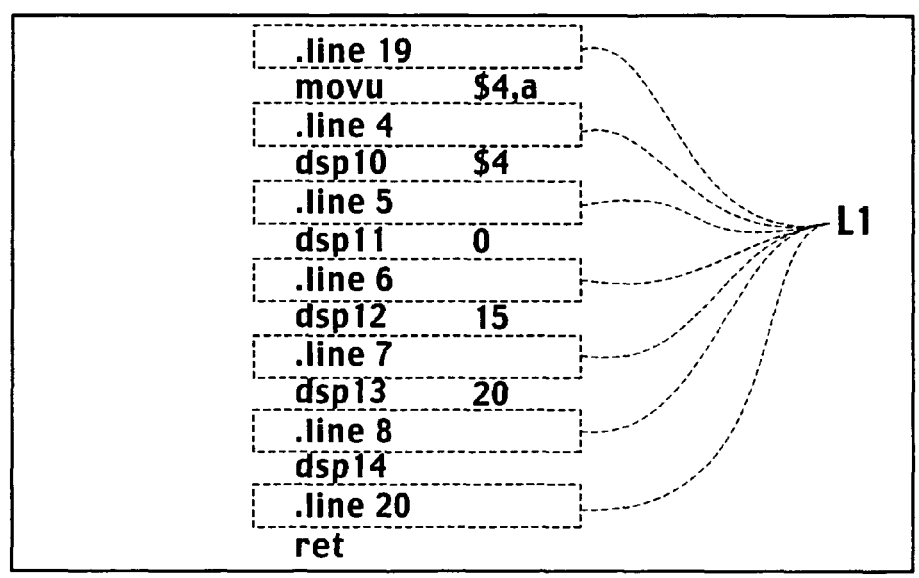
FIG. 24 is a diagram showing an object code generated from the intermediate code shown in FIG. 23.

For example, a complex intrinsic function J1 shown in FIG. 22 is converted into intermediate code shown in FIG. 23. As shown in FIG. 23, debug information (line number) K1 is added to an intermediate code generated from statements of the inline clause of the complex intrinsic function J1 shown in FIG. 22. When an optimization utilizing an intermediate code of the complex intrinsic function shown in FIG. 23 for an intermediate code generated from the source program J2 shown in FIG. 22 is executed, an object code shown in FIG. 24 is generated. With respect to an object code shown FIG. 24, debug information (line number) shown in FIG. 23 is maintained.

According to the third modification of the first embodiment, it is possible for user to inform the relationship between a source program and a complex intrinsic function replacing the source program. With respect to optimized part, it becomes possible to display the content of the inline clause of the complex intrinsic function.

In the example described above, although intermediate code optimizer 132 adds the debug information to intermediate code sequence of inline clause, the object code optimizer 134b adds the debug information to a machine language sequence of inline clause when an arrangement of the program development apparatus shown in FIG. 14 is applied.

Second Embodiment

Figure 25:
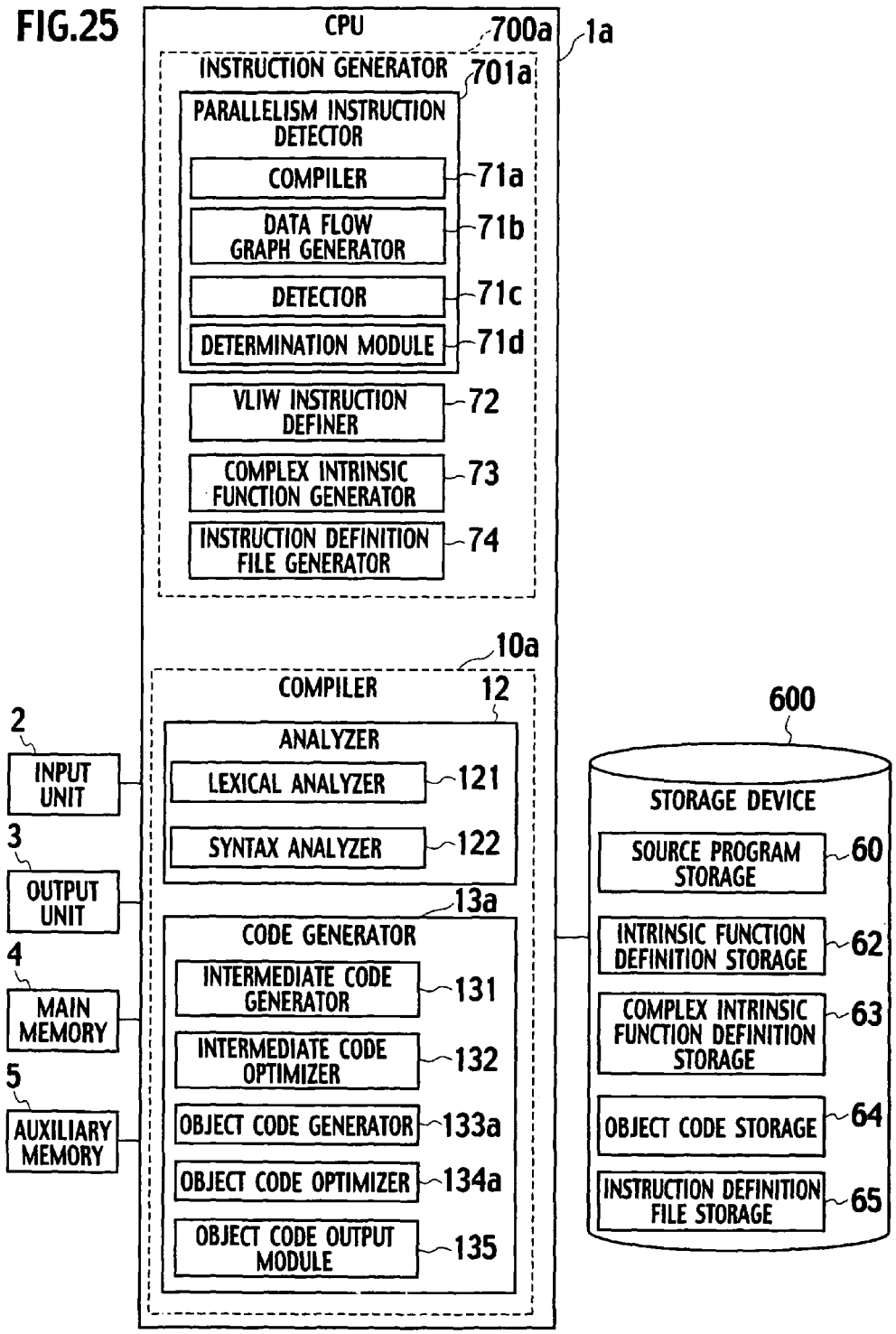
FIG. 25 is a block diagram showing an example of an arrangement of a program development apparatus according to a second embodiment of the present invention.

As shown in FIG. 25, a program development apparatus according to a second embodiment of the present invention is different from the program development apparatus shown in FIG. 1 in that the program development apparatus of the second embodiment further includes an instruction generator 700a configured to generate an extended instruction of a very long instruction word (VLIW) type (hereinafter referred as a "VLIW instruction"). Specifically, the program development apparatus shown in FIG. 25 is applied when the coprocessor 723 shown in FIG. 3 is of a VLIW type. It is possible to execute multiple instructions simultaneously by elongating an instruction word length in the VLIW instruction. Here, the "VLIW instruction" means a long instruction defining a combination of instructions to be simultaneously executed by the processor core 710 and the coprocessor 723 shown in FIG. 3 as a single instruction. An instruction generator 700a automatically generates the VLIW instruction from the source program stored in the source program storage 60. Moreover, the instruction generator 700a generates a complex intrinsic function that contains the VLIW instruction in an inline clause, and stores the complex intrinsic function in the source program storage 60.

A parallelism instruction detector 701a generates a data flow graph from the source program, and detects instructions applicable to parallel execution in the source program, based on the data flow graph. The "data flow graph" means a graph formed by connecting respective instructions in accordance with data dependence among respective operands for the multiple instructions. A VLIW instruction definer 72 defines a coprocessor instruction to be executed by the coprocessor 723 of the VLIW type from the instructions applicable to parallel execution. A complex intrinsic function generator 73 generates the complex intrinsic function by describing the VLIW instruction as statements in the inline clause and by defining a program description subjected to be optimized to the VLIW instruction in the source program as the operation definition. An instruction definition file generator 74 generates the coprocessor instruction defined by the VLIW instruction definer 72, a transfer instruction between the processor core 710 and the coprocessor 723 shown in FIG. 3, and the like. An instruction definition file generated by the instruction definition file generator 74 is stored in an instruction definition file storage 65. Other configurations are similar to those illustrated in FIG. 1.

A compiler 71a reads the source program out of the source program storage 60, and generates an assembly description by compiling the source program. Meanwhile, an existing compiler complied with the language of the source program can be used as the compiler 71a. For example, the compiler 71a generates an assembly description shown in FIG. 27 by compiling a source program shown in FIG. 26.

Figure 28:
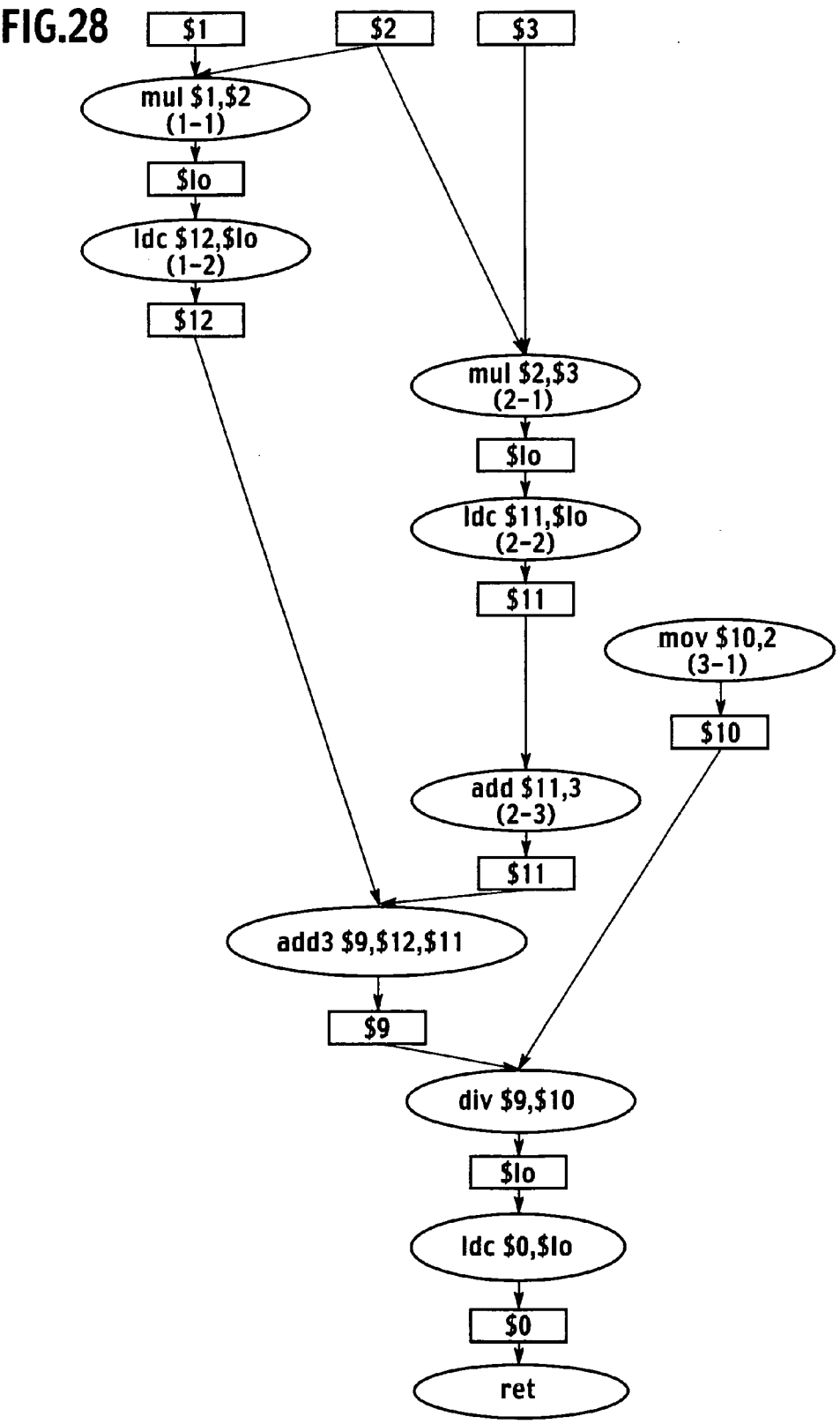
FIG. 28 is a diagram showing a data flow graph generated from the assembly description shown in FIG. 27.

A data flow graph generator 71b generates a data flow graph as shown in FIG. 28 from the assembly description generated by the compiler 71a. To be more precise, the data flow graph generator 71b generates the data flow graph by linking respective instructions into chains, based on dependence of operands in FIG. 27.

A detector 71c provides labels to respective nodes (the instructions) in the data flow graph as shown in FIG. 28. In FIG. 28, labels including (1-1), (1-2), (2-1), (2-2), (2-3), (3-1), and the like are attached to the respective nodes in the data flow graph. Here, for the purpose of simplifying the explanation, the labels are provided to only a part of the data flow graph in FIG. 28.

Figure 29:
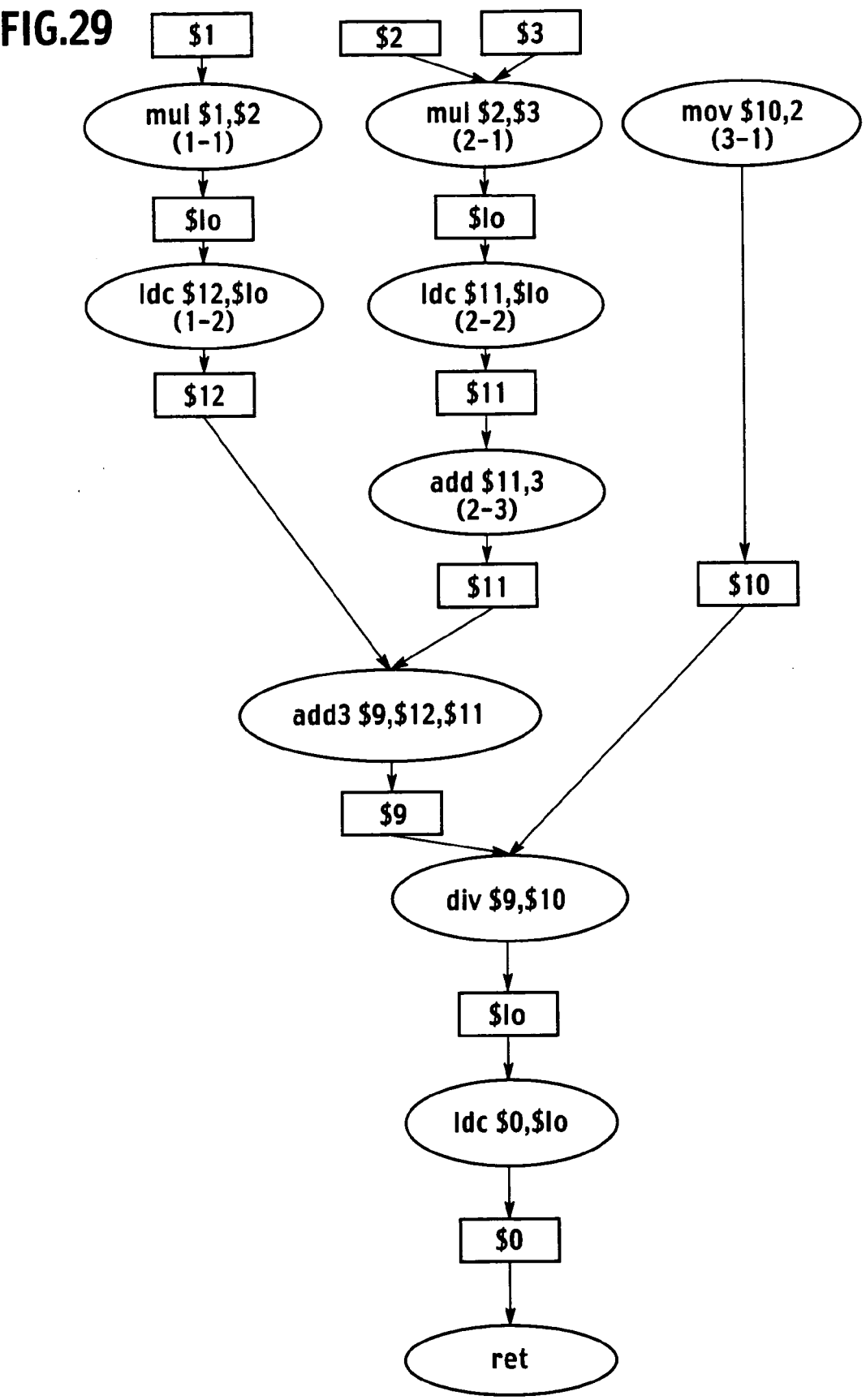
FIG. 29 is a diagram showing an example of a data flow graph modified from FIG. 28.

A detector 71c modifies the data flow graph shown in FIG. 28 as illustrated in FIG. 29 in order to detect the instructions applicable to parallel execution. Specifically, the detector 71c detects the instructions applicable to parallel execution by rearranging the respective nodes in parallel as shown in FIG. 29, which are originally dispersed in FIG. 28

Based on the data flow graph shown in FIG. 29 and in terms of the respective nodes of (1-1), (1-2), (2-1), (2-2), (2-3), and (3-1), the detector 71c detects that three sets of (1-1) and (1-2)

(hereinafter expressed as {(1-1), (1-2)}), a group of (2-1), (2-2), and (2-3) (hereinafter expressed as {(2-1), (2-2), (2-3) }), and (3-1) are applicable to parallel execution.

Moreover, the detector 71c estimates the number of cycles necessary for executing the assembly description from the data flow graphs. From the data flow graphs shown in FIG. 28, and FIG. 29, it is apparent that the total number of executed instructions is ten. Assuming that execution of a multiplication "mul" and a division "div" requires twenty cycles and that execution of each instruction other than the multiplication "mul" and the division "div" requires one cycle, the detector 71c estimates that execution of all the instructions requires 67 cycles.

Otherwise, instead of finding the number of cycles necessary for execution of the assembly description by calculation, it is possible to analyze execution of the assembly description on the target hardware or on simulation and thereby to find the number of cycles necessary for execution of the assembly description based on a result of the analysis.

Furthermore, a determination module 71d allocates the instructions applicable to parallel execution detected by the detector 71c respectively to the processor core 710 and the coprocessor 723 in accordance with the number of instruction applicable to parallel execution by the coprocessor 723 (the number will be hereinafter referred to as the "maximum parallelism"). When the maximum parallelism of the coprocessor 723 is 2, the determination module 71d allocates the assembly description having the largest number of execution cycles among the three groups, as an instruction to the coprocessor 723, and then allocates the assembly description having the second largest number of execution cycles to an instruction sequence for the processor core paired with the coprocessor instruction.

Accordingly, in the example shown in FIG. 29, the group {(2-1), (2-2), (2-3)} is defined as the coprocessor instruction sequence and the group {(1-1), (1-2)} is defined as the processor core instruction sequence to be executed in parallel. Here, the maximum parallelism may be determined by an operation to an input unit 2. Alternatively, data on the maximum parallelism may be stored in a storage device 600 in advance.

Meanwhile, the VLIW instruction definer 72 defines the coprocessor instruction equivalent to the instructions applicable to parallel execution which is to be executed by the coprocessor 723 in accordance with a result of determination by the determination module 71d. The VLIW instruction definer 72 determines the number of inputs and outputs of the instructions applicable to parallel execution based on the data flow graph, for example. Then, the VLIW instruction definer 72 interprets the instructions included in the instructions applicable to parallel execution, and generates the coprocessor instruction. When defining a new coprocessor instruction equivalent to the instruction sequence {(2-1), (2-2), (2-3)}, it is determined by the VLIW instruction definer 72 that this instruction sequence requires two inputs and one output from the data flow graph shown in FIG. 29. Moreover, assuming that all functions of the instructions to the targeted processor core 710 are registered, it is possible to derive a processing to add 3 to a result of multiplication from the instruction sequence {(2-1), (2-2), (2-3)}. Here, the instruction to the processor core 710 can be retrieved from the compiler 71a, for example.

As a result, the VLIW instruction definer 72 defines the coprocessor instruction stating "add 3 to a product of two values of a coprocessor register, then store a result of addition in the coprocessor register". The "coprocessor register" means a register to be incorporated in the coprocessor 723.

Moreover, as shown in FIG. 30, the instruction definition file generator 74 generates the coprocessor instruction defined by the VLIW instruction definer 72 and the transfer instruction between the processor core 710 and the coprocessor 723 (the coprocessor register). In FIG. 30, each of definition of instruction includes an instruction mnemonic, a bit pattern, and a description of operation. An instruction "CMOV" shown in FIG. 30 is the transfer instruction between the processor core 710 and the coprocessor register. Meanwhile, an instruction "CMAC3" shown in FIG. 30 is the single instruction combining {(2-1), (2-2), (2-3)} shown in FIG. 29, which is the coprocessor instruction stating "add 3 to a product of two values of a coprocessor register, then store a result of addition in the coprocessor register". Here, an instruction format of the instruction definition file may apply an architecture database disclosed in United States Patent Application Laid Open No. 20030204819. In this case, the compiler can generate the newly defined VLIW instruction.

Meanwhile, the complex intrinsic function generator 73 can link a source line in the source program with the assembly description by use of symbol information in the assembly description outputted from the compiler 71a in the parallelism instruction detector 701a. Accordingly, the complex built-in instruction generator 73 can cut out the source program corresponding to {(2-1), (2-2), (2-3)} shown in FIG. 29. Therefore, a script "y=c*d+3;" shown in FIG. 26 can be replaced with a script "cmac3 (tmp_c, tmp_d);" using the coprocessor instruction, and with a coprocessor register transfer instruction as shown in FIG. 31. Here, when the compiler 10a according to the first embodiment compiles the description shown in FIG. 31, an object code shown in FIG. 32 is generated as a consequence. A script "_cop" shown in FIG. 31 is an indicator for allocating a declared variable to the register in the coprocessor 723. A code "+" shown in FIG. 32 indicates combining the contextual instructions into one VLIW instruction. For example, in FIG. 32, combination of instructions "mul $1, $2" and "+cmac3 $c1, $c2" is the VLIW instruction, "+cmac3 $c1, $c2" is the coprocessor instruction.

As a result, the complex intrinsic function generator 73 generates a complex intrinsic function as shown in FIG. 33, which includes the VLIW instruction in the inline clause and includes the program description of the source program subjected to be replaced with the VLIW instruction in the operation definition. The complex intrinsic function shown in FIG. 33 is stored in the source program storage 60 shown in FIG. 25. When the compiler 10a detects the program description corresponding to an operation definition M2 of FIG. 33 in the source program, the compiler 10a optimizes the program description into statements including the VLIW instruction in an inline clause M1 of FIG. 33.

Figure 34:
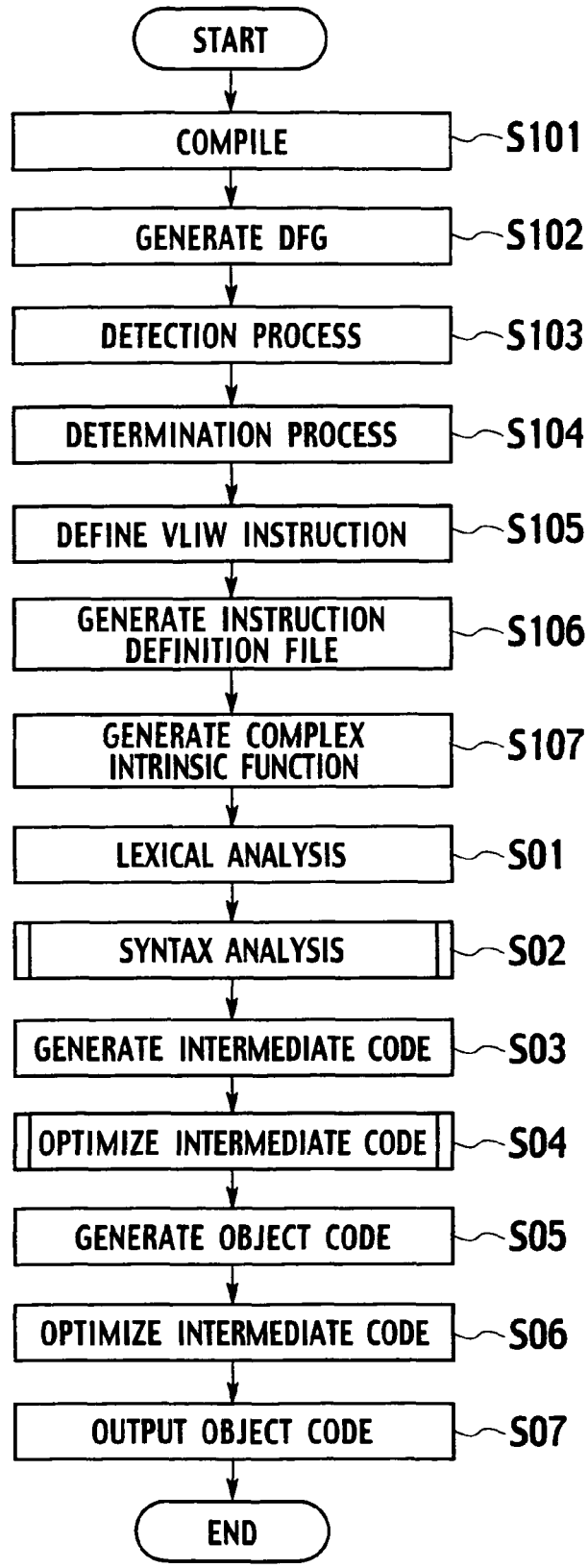
FIG. 34 is a flow chart showing an operation of the program development apparatus according to the second embodiment of the present invention.

Next, the procedure of the program development apparatus according to the second embodiment will be described by referring a flow chart shown in FIG. 34. Repeated descriptions for the same processing according to the second embodiment which are the same as the first embodiment are omitted.

In step S101, the compiler 71a shown in FIG. 25 reads a source program out of the source program storage 60, and generates an assembly description by compiling the source program.

In step S102, the data flow graph generator 71b generates the data flow graph from the assembly description generated in step S101.

In step S103, the detector 71c detects operations applicable to parallel execution from the data flow graph generated in step S102.

In step S104, the determination module 71d determines whether the operations applicable to parallel execution detected in step S103 can be converted into VLIW instruction, in accordance with the maximum parallelism of the coprocessor 723.

In step S105, the VLIW instruction definer 72 defines the operations applicable to parallel execution as VLIW instruction, in accordance with the determination result of step S104.

In step S106, the instruction definition file generator 74 generates the instruction definition file from the VLIW instruction defined in step S105. The instruction definition file generated by the instruction definition file generator 74 is stored in the instruction definition file storage 65.

In step S107, the complex intrinsic function generator 73 generates a complex intrinsic function including an inline clause having the VLIW instruction defined in step S105. The complex intrinsic function generated by the complex intrinsic function generator 73 is stored in the header file storage 61, for instance. Step S107 may be executed just before step S106 or at the same time with S106. In step S01 to S07, a process similar to FIG. 11 is executed. As a result, an object code including the VLIW instruction automatically generated.

As described above, according to the second embodiment, it is possible to generate the VLIW instruction automatically. Therefore, it is possible to take full advantage of a performance of an extensible processor. Moreover, compared with procedures in which a user adds instructions based on his experiences with trial and error, in which confirms the effects by simulation and adds the instructions when it is determined that the instructions are qualified, it is possible to generate an effective instruction to a provided application in a very short period. Therefore, it is possible to drastically reduce a development period for a program. In addition, operations applicable to parallel execution are detected by use of the data flow graphs and the VLIW instruction is generated in accordance with the maximum parallelism of the coprocessor 723. Therefore, it is possible to meet architectural restrictions of the coprocessor 723.

Modification of Second Embodiment

Figure 35:
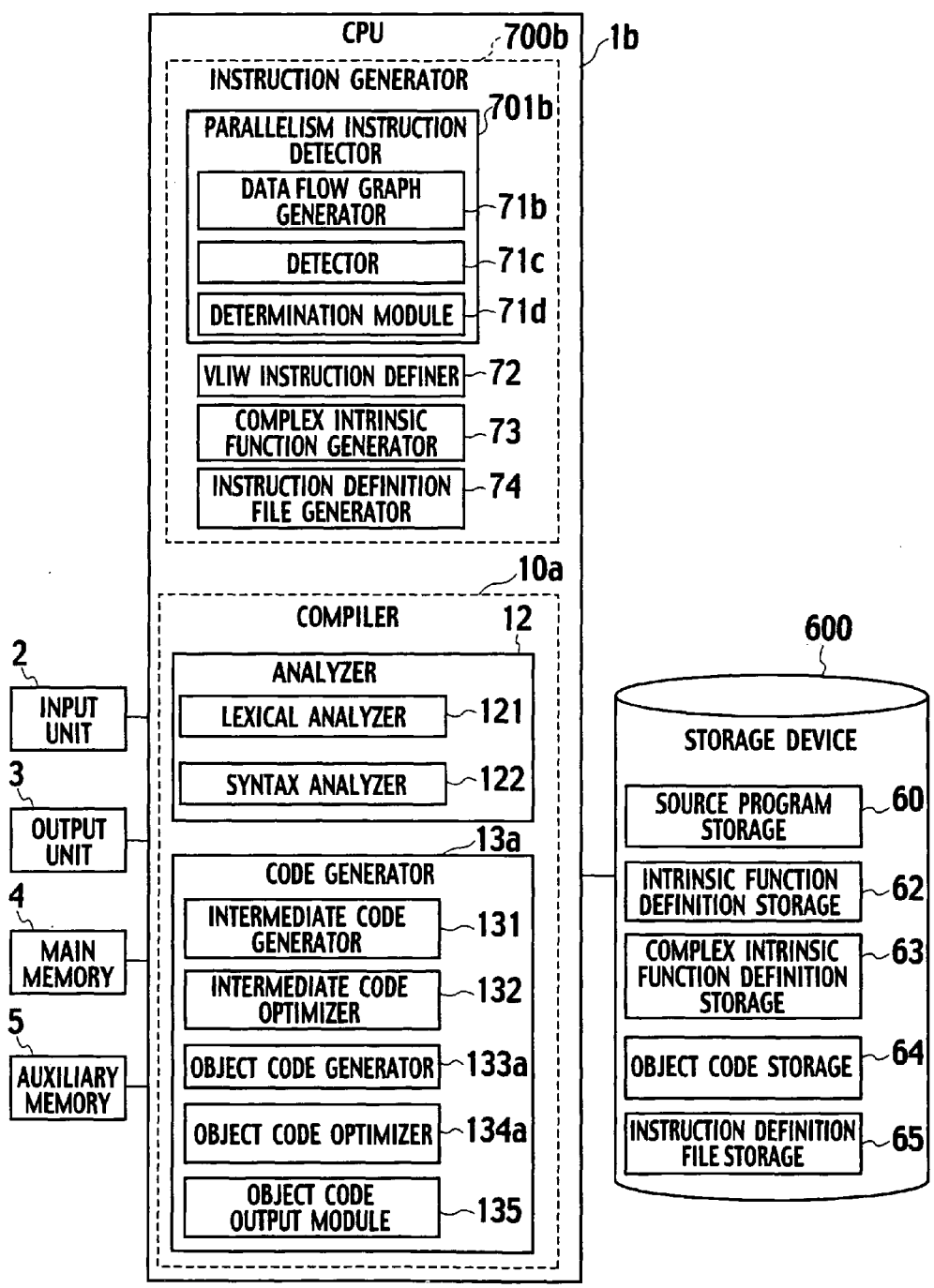
FIG. 35 is a block diagram showing an example of an arrangement of a program development apparatus according to a modification of the second embodiment of the present invention.

As shown in FIG. 35, a program development apparatus according to a modification of the second embodiment of the present invention generate the data flow graph from the source program. The program development apparatus shown in FIG. 35 does not include the compiler 71a of FIG. 25. The data flow graph generator 71b shown in FIG. 35 reads the source program out of source program storage 60, and generates a data flow graph from the source program.

According to the modification of the second embodiment, it is possible to simplify the arrangement of the parallelism instruction detector 701b because it is possible to detect instructions applicable to the parallel execution without compiling source program.

Other Embodiments

Various modifications will become possible for those skilled in the art after receiving the teachings of the present disclosure without departing from the scope thereof.

In the aforementioned first and second embodiments, the source program and the header file are individually prepared. However, the header file may be inserted into the source program.

The description has been given with regard to an example in which the source program is described by C language. However, C++ language, FORTRAN language, or hardware description language (HDL) can be applied.

The program development apparatus according to the first and second embodiments may acquire data, such as the source program and the header file via a network. In this case, the program development apparatus includes a communication controller configured to control a communication between the program development apparatus and the network.

What is claimed is:

1. A program development apparatus, comprising:
    a storage device configured to store a complex intrinsic function including both an operation definition defining a program description in a source program subjected to be optimized, and an inline clause describing statements including multiple extended instructions after the optimization, the multiple extended instructions being executed by an extended module of a target processor;
    an analyzer configured to perform a syntax analysis of the complex intrinsic function by reading the complex intrinsic function out of the storage device, so as to detect the operation definition and the inline clause;
    a code generator configured to generate an object code from the source program by optimizing a program description corresponding to the operation definition in the source program into the multiple extended instructions included in the statements in the inline clause;
    a very long instruction word (VLIW) instruction definer configured to define a VLIW instruction including a coprocessor instruction to be executed by a coprocessor of a VLIW type included in the extended module from instructions applicable to parallel execution; and
    a complex intrinsic function generator configured to generate the complex intrinsic function by describing the VLIW instruction as the statements in the inline clause, and by defining the program description in the source program subjected to be optimized to the VLIW instruction as the operation definition.

2. The program development apparatus of claim 1, wherein the storage device stores the complex intrinsic function as a part of the source program.

3. The program development apparatus of claim 1, wherein the code generator generates a history of the complex intrinsic function used for the optimization, and preferentially applies the complex intrinsic function existing in the history.

4. The program development apparatus of claim 1, wherein the code generator selectively may provides debug information to the object code.

5. The program development apparatus of claim 1, wherein the statements in the inline clause include a plurality of instructions.

6. The program development apparatus of claim 1, wherein the object code is executed by the target processor including a processor core and the extended module, and
    a program description of the source program to be executed by the extended module is described as the operation definition, and the statements for the extended module are described in the inline clause.

7. The program development apparatus of claim 1, wherein the code generator comprises:
    an intermediate code generator configured to convert the source program, the statements in the inline clause, and the operation definition into an intermediate code;
    an intermediate code optimizer configured to execute optimization to an intermediate code of the source program by utilizing an intermediate code of the statements in the inline clause and the operation definition; and an object code generator configured to generate the object code from an optimized intermediate code.

8. The program development apparatus of claim 7, wherein the intermediate code optimizer comprises:
   a correspondence determination module configured to determine whether the intermediate code of the source program corresponds to the intermediate code of the operation definition; and
   an optimizer configured to optimize an intermediate code of the source program corresponding to the intermediate code of the operation definition into the statements of the inline clause when it is determined that the intermediate code of the source program corresponds with the intermediate code of the operation definition.

9. The program development apparatus of claim 1, wherein the code generator comprises:
   an object code generator configured to convert the source program, the statements of the inline clause, and the operation definition into the object code; and
   an object code optimizer configured to execute an optimization to the object code of the source program by utilizing the object code of the statements in the inline clause and the operation definition.

10. The program development apparatus of claim 9, wherein the object code optimizer comprises:
    a correspondence determination module configured to determine whether the object code of the source program corresponds with the object code of the operation definition; and
    an optimizer configured to optimize the object code of the source program corresponding to the object code of the operation definition into the statements of the inline clause when it is determined that the object code of the source program corresponds with the object code of the operation definition.

11. The program development apparatus of claim 1, further comprising:
    a parallelism instruction detector configured to detect the instructions applicable to the parallel execution in the source program by generating a data flow graph from the source program.

12. The program development apparatus of claim 10, wherein the parallelism instruction detector determines whether the instruction applicable to parallel execution and detected by the parallelism instruction detector, is qualified as the coprocessor instruction in accordance with the number of instructions applicable to parallel execution by the coprocessor.

13. The program development apparatus of claim 10, wherein the parallelism instruction detector detects the operations applicable to parallel execution by rearranging respective instructions dispersed on the data flow graph.

14. The program development apparatus of claim 10, further comprising an instruction definition file generator configured to generate an instruction definition file including the coprocessor instruction and a transfer instruction between the processor core and the coprocessor.

15. The program development apparatus of claim 10, wherein the parallelism instruction detector estimates a number of cycles for executing respective instructions of the data flow graphs.

16. The program development apparatus of claim 15, wherein the parallelism instruction detector estimates the number of cycles based on a result of analysis on a target hardware or a simulator.

17. A method for developing a program in a program development apparatus, comprising:
    storing in a storage device of the program development apparatus, a complex intrinsic function including both an operation definition defining a program description in a source program subjected to be optimized, and an inline clause describing statements including multiple extended instructions after the optimization, the multiple extended instructions being executed by an extended module of a target processor;
    performing, by an analyzer of the program development apparatus, a syntax analysis of the complex intrinsic function by reading the complex intrinsic function out of the storage device, so as to detect the operation definition and the inline clause;
    generating, by a code generator of the program development apparatus, an object code from the source program by optimizing a program description corresponding to the operation definition in the source program into the multiple extended instructions included in the statements in the inline clause;
    defining a very long word (VLIW) instruction including a coprocessor instruction to be executed by a coprocessor of a VLIW type included in the extended module from instructions applicable to parallel execution; and
    generating the complex intrinsic function by describing the VLIW instruction as the statements in the inline clause, and by defining the program description in the source program subjected to be optimized to the VLIW instruction as the operation definition.

18. The method of claim 17, further comprising:
    detecting the instructions applicable to the parallel execution in the source program by generating a data flow graph from the source program.

19. A non-transitory computer-readable medium storing a computer program that when executed by a program development apparatus, causes the programs development apparatus to execute instructions comprising:
    instructions configured to store a complex intrinsic function including both an operation definition defining a program description in a source program subjected to be optimized, and an inline clause describing statements including multiple extended instructions after the optimization, the multiple extended instructions being executed by an extended module of a target processor;
    instructions configured to perform a syntax analysis of the complex intrinsic function by reading the complex intrinsic function out of the storage device, so as to detect the operation definition and the inline clause;
    instructions configured to generate an object code from the source program by optimizing a program description corresponding to the operation definition in the source program into the multiple extended instructions included in the statements in the inline clause;
    instructions for defining a very long word (VLIW) instruction including a coprocessor instruction to be executed by a coprocessor of a VLIW type included in the extended module from instructions applicable to parallel execution; and
    instructions for generating the complex intrinsic function by describing the VLIW instruction as the statements in the inline clause, and by defining the program description in the source program subjected to be optimized to the VLIW instruction as the operation definition.

20. The non-transitory computer-readable medium of claim 19, further comprising:
    instructions configured to detect the instructions applicable to the parallel execution in the source program by generating a data flow graph from the source program.

* * * * *